(12) United States Patent
Watanabe

(10) Patent No.: US 10,394,549 B2
(45) Date of Patent: Aug. 27, 2019

(54) INFORMATION PROCESSING APPARATUS, UPDATING METHOD, AND RECORDING MEDIUM

(71) Applicant: Genki Watanabe, Tokyo (JP)

(72) Inventor: Genki Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/915,095

(22) Filed: Mar. 8, 2018

(65) Prior Publication Data
US 2018/0267793 A1 Sep. 20, 2018

(30) Foreign Application Priority Data

Mar. 17, 2017 (JP) .................................. 2017-053608
Feb. 6, 2018 (JP) .................................. 2018-019560

(51) Int. Cl.
| | |
|---|---|
| *G06F 3/06* | (2006.01) |
| *G06F 11/14* | (2006.01) |
| *G06F 11/20* | (2006.01) |
| *G06F 8/654* | (2018.01) |
| *G06F 9/4401* | (2018.01) |

(52) U.S. Cl.
CPC ............ *G06F 8/654* (2018.02); *G06F 3/0604* (2013.01); *G06F 3/0659* (2013.01); *G06F 3/0673* (2013.01); *G06F 9/442* (2013.01); *G06F 11/1433* (2013.01); *G06F 11/2094* (2013.01)

(58) Field of Classification Search
CPC .... G06F 8/65; G06F 11/1433; G06F 11/1417; G06F 11/20; G06F 11/1441; G06F 9/4401; G06F 16/2379

USPC .......................................... 717/169, 168, 170
See application file for complete search history.

(56) References Cited

U.S. PATENT DOCUMENTS

| | | | | |
|---|---|---|---|---|
| 6,463,584 | B1 * | 10/2002 | Gard | ................... G06F 11/1433 717/171 |
| 7,024,581 | B1 * | 4/2006 | Wang | ................. G06F 11/1417 713/2 |
| 2004/0153733 | A1 * | 8/2004 | Lin | ...................... G06F 11/1417 714/6.12 |
| 2004/0205776 | A1 * | 10/2004 | Harrington | ............. G06F 8/656 719/320 |

(Continued)

FOREIGN PATENT DOCUMENTS

| | | |
|---|---|---|
| JP | 2008-284711 | 11/2008 |
| JP | 2013-109450 | 6/2013 |
| JP | 2015-212879 | 11/2015 |

*Primary Examiner* — Phillip H Nguyen
(74) *Attorney, Agent, or Firm* — Oblon, McClelland, Maier & Neustadt, L.L.P.

(57) ABSTRACT

An information processing apparatus includes: a memory including a plurality of storage areas including a first storage area and a second storage area each of which stores a same program; and circuitry to: obtain an update program to be used for updating the program stored in each one of the first storage area and the second storage area; update the program stored in the second storage area with the update program, when the first storage area is activated and the second storage area is not activated; and control the information processing apparatus to start operating with the updated program stored in the second storage area, after shutdown and activation of the information processing apparatus.

17 Claims, 24 Drawing Sheets

(56) References Cited

U.S. PATENT DOCUMENTS

| | | | |
|---|---|---|---|
| 2005/0055684 A1* | 3/2005 | Rao | G06F 8/65 |
| | | | 717/168 |
| 2008/0005527 A1* | 1/2008 | Bang | G06F 9/441 |
| | | | 711/202 |
| 2008/0052506 A1 | 2/2008 | Iima et al. | |
| 2008/0201694 A1 | 8/2008 | Goldberg et al. | |
| 2009/0125897 A1* | 5/2009 | Matlin | G06F 8/63 |
| | | | 717/168 |
| 2009/0125900 A1* | 5/2009 | Matlin | G06F 8/65 |
| | | | 717/173 |
| 2010/0241838 A1* | 9/2010 | Cohen | G06F 11/1004 |
| | | | 713/2 |
| 2010/0281297 A1 | 11/2010 | Jibbe et al. | |
| 2011/0093843 A1* | 4/2011 | Endo | G06F 8/65 |
| | | | 717/170 |
| 2012/0023309 A1* | 1/2012 | Abraham | G06F 11/00 |
| | | | 712/30 |
| 2013/0070298 A1 | 3/2013 | Watanabe | |
| 2013/0125107 A1* | 5/2013 | Bandakka | G06F 11/1417 |
| | | | 717/171 |
| 2014/0122329 A1* | 5/2014 | Naggar | G06Q 20/3552 |
| | | | 705/41 |
| 2014/0149894 A1 | 5/2014 | Watanabe et al. | |
| 2015/0149990 A1* | 5/2015 | Nakamura | G06F 8/65 |
| | | | 717/171 |
| 2015/0338898 A1 | 11/2015 | Yoshida et al. | |
| 2015/0358491 A1 | 12/2015 | Watanabe et al. | |
| 2016/0062838 A1 | 3/2016 | Suwabe | |
| 2017/0272946 A1 | 9/2017 | Watanabe | |

* cited by examiner

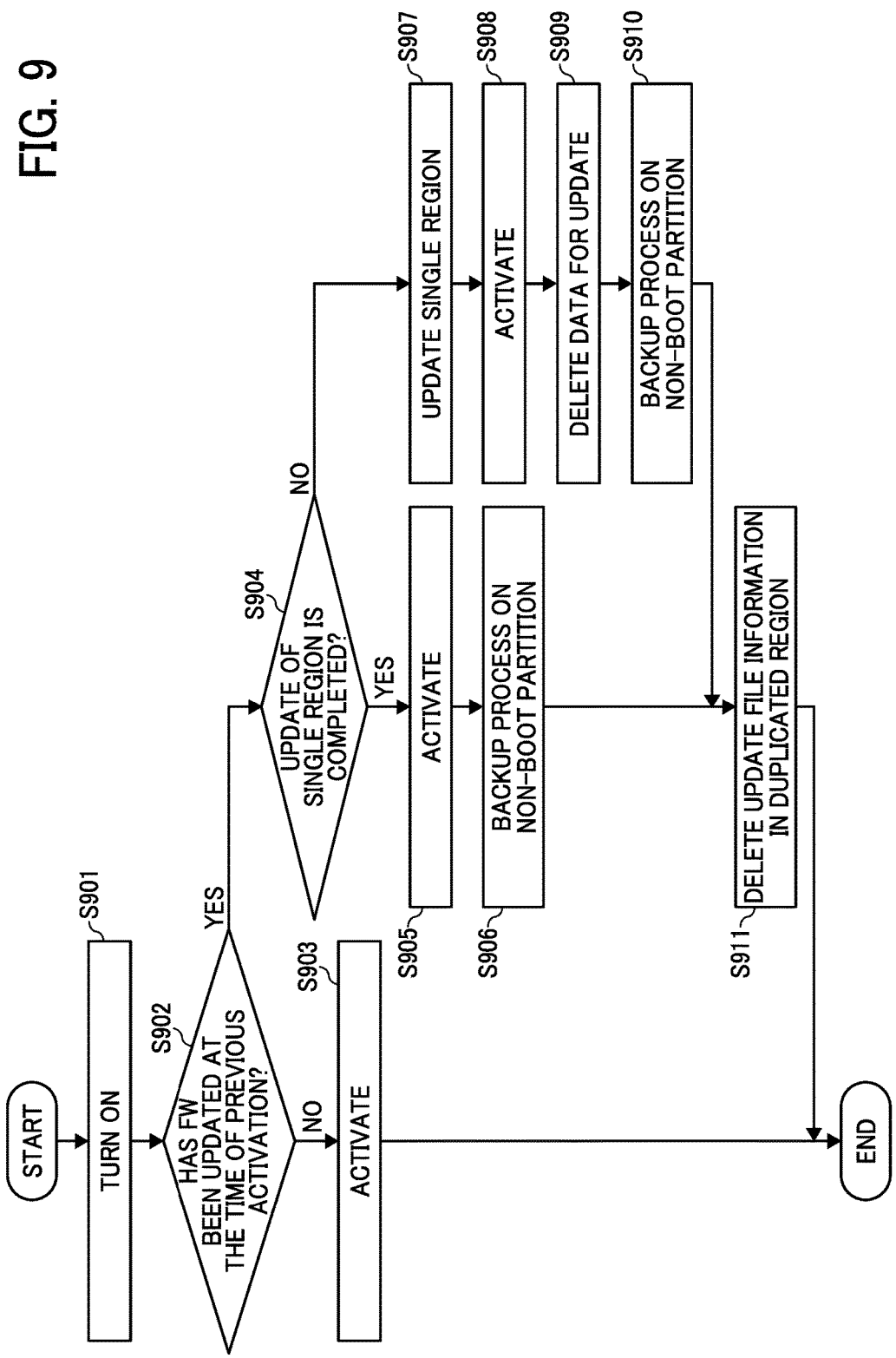

ALTHOUGH PREVIOUS FIRMWARE UPDATE HAS FAILED, YOU CAN CONTINUOUSLY USE THIS APPARATUS.
PLEASE UPDATE AGAIN IF NECESSARY.

CONFIRMED

| SET VALUE NUMBER | SET VALUE STORAGE | DEVICE USING SETTING DATA |
|---|---|---|
| SP1-002-625 | ENGINE | NONE |
| SP1-180-020 | ENGINE | SCANNER |
| SP2-588-001 | ENGINE | PLOTTER |
| SP3-588-125 | ENGINE | PLOTTER |
| SP5-552-785 | CONTROLLER | NONE |
| SP5-652-185 | CONTROLLER | NONE |
| SP5-662-005 | CONTROLLER | NONE |
| SP5-782-001 | CONTROLLER | NONE |
| SP5-852-015 | CONTROLLER | NONE |
| SP7-001-001 | OPERATION UNIT | NONE |
| SP7-589-634 | OPERATION UNIT | NONE |
| SP7-652-458 | OPERATION UNIT | NONE |
| SP7-669-851 | OPERATION UNIT | NONE |
| SP7-712-002 | OPERATION UNIT | NONE |
| SP7-859-325 | OPERATION UNIT | NONE |
| SP7-885-251 | OPERATION UNIT | NONE |
| SP7-962-325 | OPERATION UNIT | NONE |

FIG. 19A

| FIG. 19 | FIG. 19A | FIG. 19B |

1711

| UPDATE TARGET FW | DEVICE STORING FW | CHANGEABLE SET VALUE |
|---|---|---|
| CONTROLLER SYSTEM | CONTROLLER | ALL |
| PRINTER | CONTROLLER | ALL |
| SCANNER | CONTROLLER | ALL |
| COPY | CONTROLLER | ALL |
| FAX | CONTROLLER | ALL |
| EXTENDABLE APPLICATION | CONTROLLER | ALL |
| NETWORK | CONTROLLER | ALL |
| OPERATION SYSTEM | OPERATION UNIT | RESTRICTION ON ONLY OPERATION UNIT SET VALUE (NEED REACTIVATION OF OPERATION UNIT) |
| OPERATION BROWSER | OPERATION UNIT | ALL |
| OPERATION NETWORK | OPERATION UNIT | ALL |
| JOB MANAGEMENT APPLICATION | OPERATION UNIT | ALL |
| PRINTER INFORMATION DISPLAY APPLICATION | OPERATION UNIT | ALL |
| ERROR MANAGEMENT APPLICATION | OPERATION UNIT | ALL |
| STATE MONITORING APPLICATION | OPERATION UNIT | ALL |
| PLOTTER | ENGINE | RESTRICTION ON ONLY ENGINE SET VALUE (NEED REACTIVATION OF ENGINE) |
| SCANNER | ENGINE | RESTRICTION ON ONLY ENGINE SET VALUE (NEED REACTIVATION OF ENGINE) |
| FINISHER | ENGINE | RESTRICTION ON ONLY ENGINE SET VALUE (NEED REACTIVATION OF ENGINE) |

FIG. 19B

| PANEL OPERATION DURING UPDATING | OPERABLE DEVICE DURING UPDATING |
|---|---|
| ALLOWED | PLOTTER/SCANNER |
| ALLOWED | PLOTTER/SCANNER |
| ALLOWED | PLOTTER/SCANNER |
| ALLOWED | PLOTTER/SCANNER |
| ALLOWED | PLOTTER/SCANNER |
| ALLOWED | PLOTTER/SCANNER |
| ALLOWED | PLOTTER/SCANNER |
| NOT ALLOWED | NOT ALLOWED |
| ALLOWED | NOT ALLOWED |
| ALLOWED | NOT ALLOWED |
| ALLOWED | NOT ALLOWED |
| ALLOWED | NOT ALLOWED |
| ALLOWED | NOT ALLOWED |
| ALLOWED | NOT ALLOWED |
| ALLOWED | NOT ALLOWED |
| ALLOWED | NOT ALLOWED |
| ALLOWED | NOT ALLOWED |

FIG. 21

CONFIGURATION FOR INSTALLATION

PLEASE SELECT PROCESSING

- ONLY TRANSFER SET VALUE
- ONLY UPDATE FIRMWARE
- TRANSFER SET VALUE AND UPDATE FIRMWARE ~2101

CANCEL    EXECUTE

FIG. 22

SYSTEM MESSAGE

CONFIGURATION FOR INSTALLATION : TOTAL PROGRESS 70%
TRANSFER SET VALUE : PROGRESS 50%
UPDATE FIRMWARE : PROGRESS 90%

↓

SYSTEM MESSAGE

CONFIGURATION FOR INSTALLATION : TOTAL PROGRESS 90%
TRANSFER SET VALUE : PROGRESS 80%
UPDATE FIRMWARE : COMPLETED

↓

SYSTEM MESSAGE

CONFIGURATION FOR INSTALLATION : COMPLETED
TRANSFER SET VALUE : COMPLETED
UPDATE FIRMWARE : COMPLETED

FIG. 23

| CONFIRMATION ON CONFIGURATION PROCESS |
|---|
| UPDATE OF FIRMWARE COMPLETED. YOU HAVE 4 MINS. TILL COMPLETION OF SET VALUE UPDATE.<br><br>DO YOU PREFER TO CONTINUE PROCESSING?<br><br>IF YOU INTERRUPT OPERATION, FIRMWARE IS NOT UPDATED. |
| [ INTERRUPT OPERATION ]   [ CONTINUE OPERATION ] |

INFORMATION PROCESSING APPARATUS, UPDATING METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2017-053608, filed on Mar. 17, 2017, and 2018-019560, filed on Feb. 6, 2018, in the Japan Patent Office, the entire disclosure of which is hereby incorporated by reference herein.

BACKGROUND

Technical Field

The present invention relates to an information processing apparatus, an updating method, and a recording medium.

Description of the Related Art

The apparatus such as the image forming apparatus executes a program referred to as firmware, which is stored in a nonvolatile memory, to perform various processing. In recent years, the firmware can be rewritten or updated so as to correct defects or extend functions of the apparatus.

To update the firmware, an update program may be acquired from an external memory such as an SD card or a universal serial bus (USB) memory, or received from an external remote server, which executes an update process. In particular, a method for reducing a memory usage at the time of updating of the firmware and restoring the apparatus at the time of a power interruption or a failure has been revised.

However, in a conventional firmware update process, the apparatus cannot be used during the update process. Furthermore, in a case where the update of the firmware has failed due to a power interruption caused by a power failure and the like, the apparatus cannot be used during the restoration process.

SUMMARY

Example embodiments of the present invention include an information processing apparatus including: a memory including a plurality of storage areas including a first storage area and a second storage area each of which stores a same program; and circuitry to: obtain an update program to be used for updating the program stored in each one of the first storage area and the second storage area; update the program stored in the second storage area with the update program, when the first storage area is activated and the second storage area is not activated; and control the information processing apparatus to start operating with the updated program stored in the second storage area, after shutdown and activation of the information processing apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 9 is a flowchart illustrating operation to be performed after activation, in an example case in which the update process of a single partition is not normally completed;

FIG. 18 is an illustration of an example setting data management table according to the second embodiment;

FIGS. 19A and 19B are an illustration of an example update control table according to the second embodiment;

FIG. 21 is an illustration of an example display screen, according to the second embodiment;

FIG. 22 is an illustration of an example screen with a dialogue, according to the second embodiment;

FIG. 23 is an illustration of an example display screen, according to the second embodiment.

Figure 1:
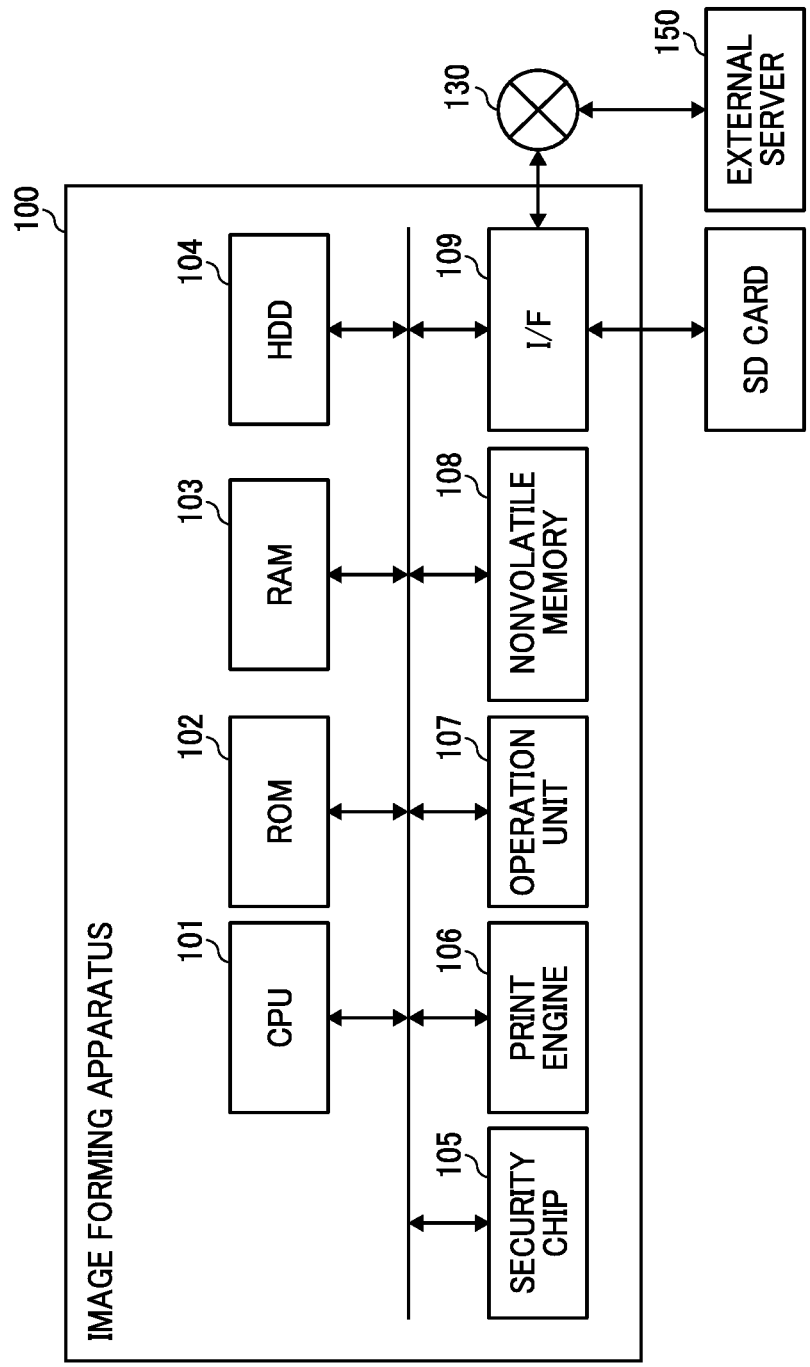
FIG. 1 is a schematic diagram illustrating a hardware configuration of an image forming apparatus according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an image forming apparatus is mainly described with reference to the drawings as an example of an information processing apparatus of the present embodiment. The present embodiment can also be applied to other information processing apparatus, such as the general-purpose computer.

FIG. 1 illustrates an exemplary hardware configuration of an image forming apparatus 100 according to a first embodiment. The image forming apparatus 100 includes a central processing unit (CPU) 101, a read only memory (ROM) 102, a random access memory 9, an operation unit 107, a nonvolatile memory 108, and an interface (I/F) 109.

To implement various functions such as a copy function, a scanner function, a facsimile function, and a printer function, the CPU 101 comprehensively controls an operation of hardware in the image forming apparatus 100. The CPU 101 executes firmware and a control program stored in the ROM 102 or the HDD 104 using the RAM 103 as a work area to control an operation of the entire image forming apparatus 100.

The RAM 103 is a volatile memory, which stores data to function as the work area of the CPU 101. The ROM 102 is a non-volatile memory that stores data, and a NAND flash memory is used in the present embodiment. A storage area of the ROM 102 is divided into a plurality of partitions, and stores a program used for updating according to the present embodiment.

The HDD 104 is a non-volatile auxiliary memory, which stores data. The nonvolatile memory 108 is a memory such as an electrically erasable programmable read only memory (EEPROM), which keeps storing data even after power of the apparatus is turned off. The nonvolatile memory 108 stores an activation program, which is executed when the image forming apparatus 100 is turned on, such as a boot loader.

The operation unit 107 is a user interface, which receives various inputs from a user and displays various kinds of information. The operation unit 107 includes a flat-type panel display as a display device, and a touch panel mounted on the panel display as an input device. The information displayed on the operation unit 107 is, for example, the execution result of an accepted job, information indicating an operation state of the image forming apparatus 100, and information indicating a setting state.

The I/F 109 includes an interface that connects the image forming apparatus 100 to a network 130. The I/F 109 enables the image forming apparatus 100 to communicate with an external server 150 and the like via the network 130, for example, to acquire an update program and the like from the external server 150. The I/F 109 further includes a terminal to be connected to an SD card, which acquires an update program and the like from the SD card.

The print engine 106 performs at least one of image forming jobs including printing, copying, scanning, and faxing. The print engine 106 includes, for example, a scanner which scans an image of a document into image data, an image forming device that forms an image on a recording medium such as a recording sheet, and a conveyance device that conveys the recording sheet. In addition, the print engine 106 may include a finisher that sorts the sheets after the image has been formed, and an automatic document feeder which automatically feeds the document.

The security chip 105 is a trusted platform module (TPM), which is provided to prevent leakage of data. The security chip 105 encrypts data and stores the encrypted data in the HDD 104, the ROM 102, and the like. The security chip 105 decrypts the encrypted data stored in the HDD 104, the ROM 102, and the like to make the data available. In this example, a key used to encrypt the data and a key used to decrypt the data may be the same. Alternatively, the keys may be different as long as they are associated with each other. Hereinafter, the key used to encrypt the data and the key used to decrypt the data are referred to as an encryption key.

Figure 2:
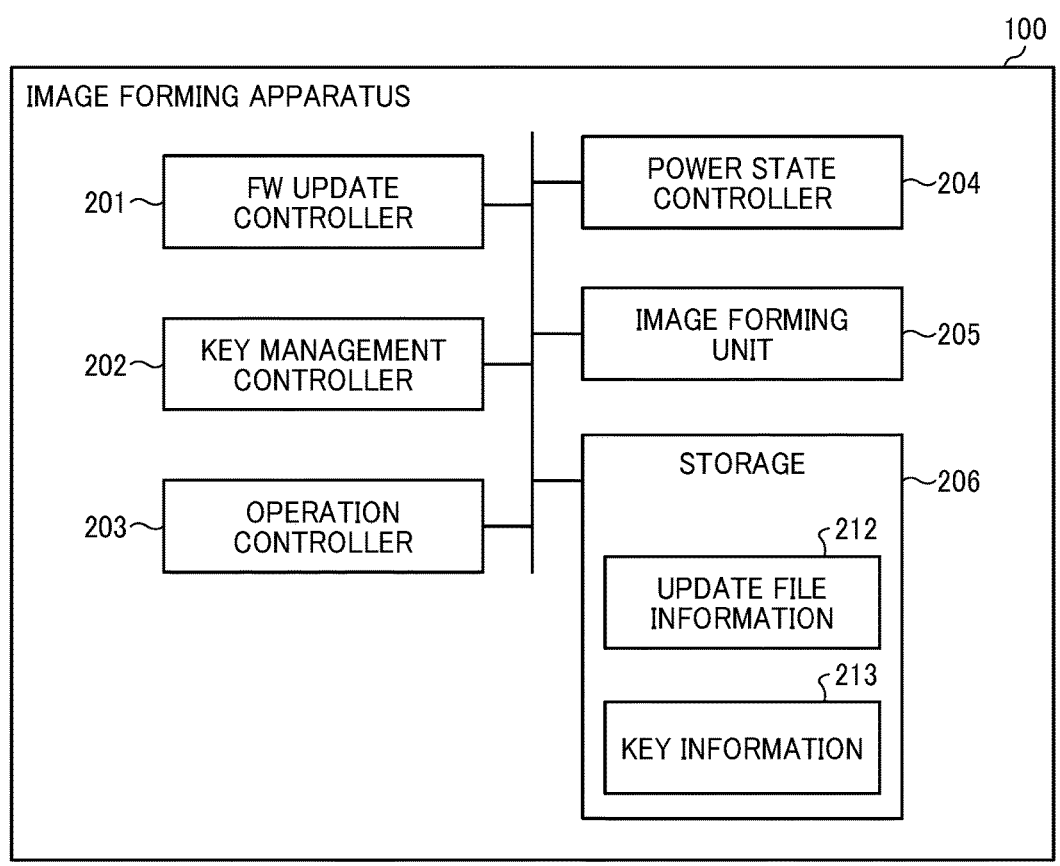
FIG. 2 is a schematic diagram illustrating a functional configuration of the image forming apparatus according to the first embodiment.

FIG. 2 is a diagram illustrating a software configuration of the image forming apparatus 100 according to the embodiment. The image forming apparatus 100 includes a firmware (FW) update controller 201, a key management controller 202, an operation controller 203, a power state controller 204, an image forming unit 205, and a storage 206. In the drawings, the firmware is expressed as "FW". Details of each functional unit will be described below.

The firmware update controller 201 executes an update process on the firmware and various data stored in the ROM 102. The firmware update controller 201 receives data from the external server 150 via the SD card and the network 130 to acquire update file information 212 and key information 213 and store the acquired information in the storage 206. It is assumed that a program which implements the function for the firmware update controller 201 be stored in any one of the nonvolatile memory 108, the ROM 102, and the HDD 104. That is, the CPU 101 operates as the firmware update controller 201 according to the program stored in any desired memory.

The key management controller 202, implemented by the security chip 105, verifies signature information attached to the acquired update file information 212, and encrypts and decrypts the data. Control data used by the key management controller 202 such as an encryption key may be updated in some cases.

The operation controller 203 is implemented by an input unit which accepts user's operation and a display which displays a message to be notified to the user. In this example, the operation controller 203 is implemented by the operation unit 107 illustrated in FIG. 1, and accepts the input from the user and displays various kinds of information. Furthermore, the operation controller 203 is a functional unit which controls general operations performed by the user, and detects, for example, an operation of a physical switch or a touch panel for turning on/off a main power supply to the image forming apparatus 100.

The power state controller 204 controls various states of the image forming apparatus, such as shutdown and activation of the image forming apparatus 100, transition to a power saving mode, and restoration from the power saving mode to an operation mode. In the power saving mode, the power state controller 204 restores the image forming apparatus 100 from the power saving mode with a touch panel operation of the operation controller 203, a timer, an external access via a network, and the like as a trigger. Other than the above, the power state controller 204 has a function of executing the activation program stored in the nonvolatile memory 108 when the power supply is turned on and activating the program stored in the ROM 102 and the HDD 104.

The image forming unit 205 performs a function of forming an image on a recording sheet. The image forming unit 205 is implemented by, for example, the print engine 106 in FIG. 1 and a program operated by the CPU 101.

The storage 206 is implemented by any one of or all of the above-described memories, i.e., the RAM 103, the ROM 102, and the HDD 104. The storage 206 temporarily stores the update file information 212 and the key information 213 acquired from the SD card or the external server 150. The update file information 212 includes list data in which names and paths of all the files to be updated are listed, the update program itself, and data for setting control. The key information 213 is a collection of files required for a key update process. The SD card and the external server 150 provide the update file information 212 and the key information 213 in a compressed format. The provided update file information 212 and key information 213 are deployed by the firmware update controller 201 and stored in the storage 206.

Figure 3:
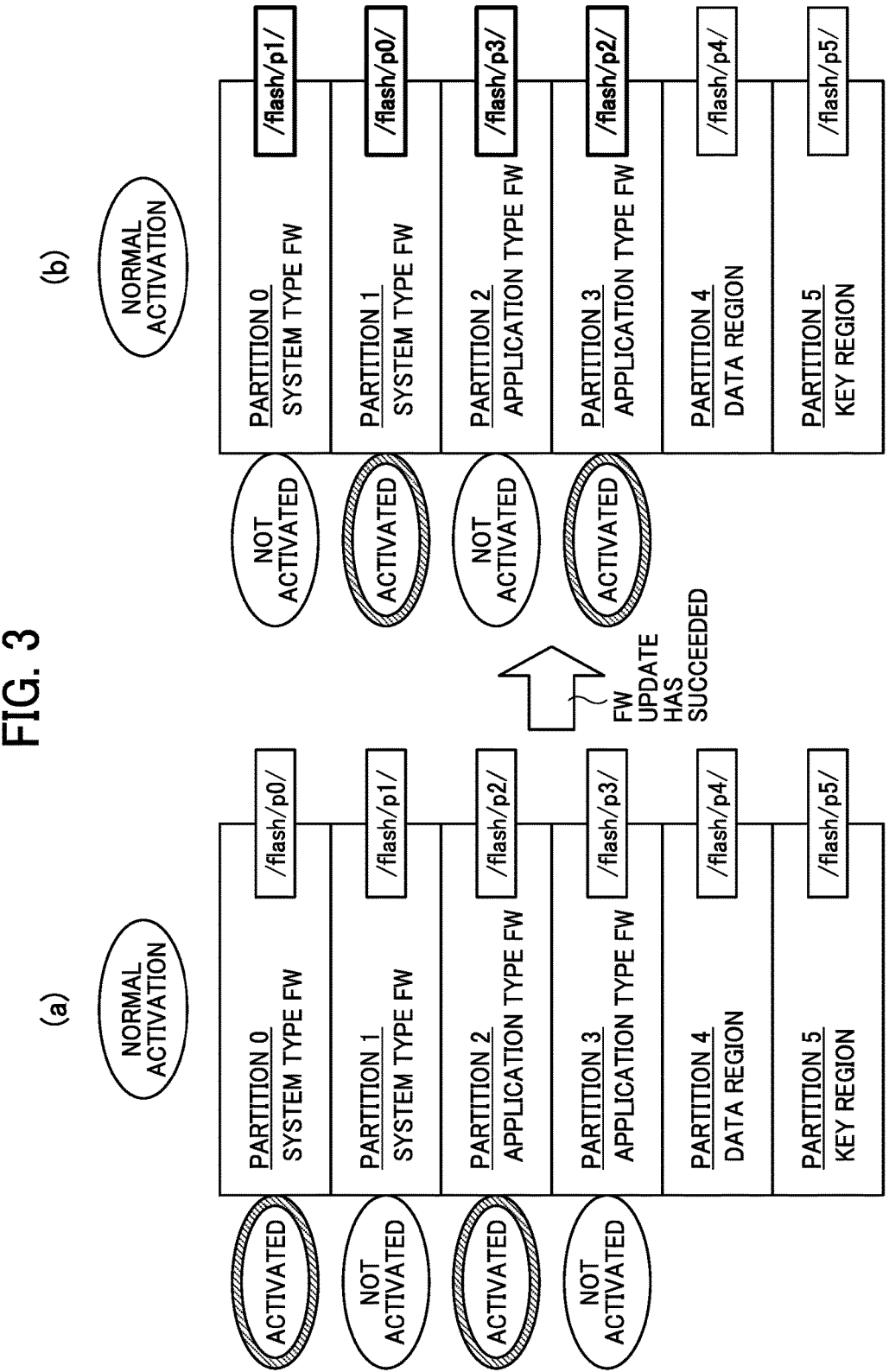
FIG. 3 is a diagram of an exemplary partition configuration and boot partitions before and after firmware update according to the first embodiment.

Processing to update firmware according to the present embodiment is described referring to FIG. 3. FIG. 3 illustrates a configuration of partitions in the ROM 102, with information indicating which partition is activated. (a) of FIG. 3 illustrates states of boot partitions and non-boot partitions before the firmware update, and (b) of FIG. 3 illustrates states of the boot partitions and the non-boot partitions after the firmware has been normally updated.

As illustrated in FIG. 3, in the present embodiment, the firmware is classified into two types, i.e., system type firmware and application type firmware which are previously determined. In the drawings, the application type firmware is referred to as app type firmware.

The application type firmware is different from the system type firmware. The application type firmware directly receives a parameter value and an execution instruction of a job including copying, scanning, printing, and fax transmission from the user and directly notifies the user of the execution result and the like. The system type firmware is a program for receiving an instruction from the application type firmware and controls hardware such as the print engine 106. The system type firmware returns the operation result of the hardware to the application type firmware.

The ROM 102 is logically divided into six storage areas. Here, it is assumed that the six storage areas respectively correspond to partitions 0 to 5. The partitions 0 and 1 store the same system type firmware. The image forming apparatus 100 is activated with the firmware stored in one of these partitions and does not use the firmware stored in the other partition of these partitions. The partitions 0 and 1 are duplicated so as to achieve such an operation. Hereinafter, as appropriate, the partition which activates the apparatus is referred to as a boot partition, and the partition which is not used at the time of the activation is referred to as a non-boot partition.

Partitions 2 and 3 store the same application type firmware. The partitions 2 and 3 are duplicated so that one of the partitions serves as a boot partition and the other serves as a non-boot partition.

A partition 4 stores data, and is an area where data owned by the user and a temporary file to operate software are stored. The partition 5 stores information required for processing by the security chip 105, such as an encryption standard, a setting file defining a key length, and the encryption key. The partitions 4 and 5 are not duplicated in the present embodiment. A partition which is not duplicated in this way is referred to as a single partition, for simplicity.

In this embodiment, the partitions 0 and 2 correspond to a first storage area, and the partitions 1 and 3 correspond to a second storage area. In addition, each of the single partitions 4 and 5 corresponds to a third storage area. The system type firmware corresponds to a first program, and the application type firmware corresponds to a second program.

In a state illustrated in (a) of FIG. 3, the system type firmware is activated with the partition 0, and the application type firmware is activated with the partition 2. The partitions 1 and 3 are non-boot partitions. When executing the update process, the firmware update controller 201 executes the update process on the non-boot partitions. That is, when updating the system type firmware, the firmware update controller 201 writes the non-boot partition 1. When updating the application type firmware, the firmware update controller 201 writes the non-boot partition 3 to execute the update process. When the update process is normally completed, the firmware update controller 201 controls to activate the image forming apparatus 100 with the firmware in the updated partition when the image forming apparatus 100 is reactivated. It is assumed that the image forming apparatus 100 be reactivated by the user's operation. However, the image forming apparatus 100 may be automatically reactivated at a specified time, which may be specified, such as any time late at night and the like.

When the power supply is turned on, as described above, the power state controller 204 executes an activation process by using the activation program such as a boot loader. The power state controller 204 determines the partition to be used for activation by referring to data indicating the setting of the activation written in a predetermined storage area. When the update process is successful, the firmware update controller 201 rewrites the setting data stored in the predetermined storage area and controls to perform activation with the updated partition. Hereinafter, the setting data rewriting process is referred to as a switching process, and the setting data to be rewritten is referred to as switching data (area specifying data).

The switching data includes data, with which the firmware to be activated can be specified, such as an address in which the firmware to be activated is stored, a file name of the firmware, and identification information of the partition. The switching data includes two kinds of data, i.e., data to switch the partitions 0 and 1 and data to switch the partitions 2 and 3.

The firmware update controller 201 executes the switching process to switch the state where the activation is performed with the partitions 0 and 2 to a state where the activation is performed with the partitions 1 and 3 as illustrated in (b) of FIG. 3. Furthermore, for example, when the non-boot partition 1 is updated and the non-boot partition 3 is not updated, the firmware update controller 201 may execute the switching process on the switching data of the partitions 0 and 1.

It is assumed that the firmware update controller 201 execute the switch process at the end of the update process. The firmware update controller 201 executes the switching process in a case where the update process has been normally completed. That is, in a case where the update process has been abnormally terminated, the switching process is not executed, and the switching data is not rewritten.

The firmware update controller 201 executes the update process in the background. That is, in any state, such as when a job which is an image forming operation including printing, scanning, faxing, and copying is performed, when the user sets a job parameter, during the power saving mode, and in a standby state, the firmware update controller 201 executes the update process in the background while maintaining these states.

Furthermore, the partitions 4 and 5, each being a single partition, execute the update process while an operation to shut down the image forming apparatus 100 is being performed. The data of the encryption key is used for security verification during network communication in some cases. For this reasons, a change made in the data of the encryption key in the background may cause a trouble in an operation in the foreground. Therefore, the firmware update controller 201 updates the data of the encryption key and the like during shutdown when the operation in the foreground is terminated, and activates the apparatus at the next activation in the updated state.

If a shutdown process is not normally executed due to a power failure and the like and the update process of the partition 4 or the partition 5 is not executed, the firmware update controller 201 executes the update process on the partitions 4 and 5 at the time of next activation.

As illustrated in FIG. 3, in the present embodiment, the same mount path is allocated to the boot partition and the non-boot partition. In a case of FIG. 3, the paths of the boot partitions are /flash/P0, /flash/P2, /flash/P4, and /flash/P5 before and after the update. Furthermore, the paths of the non-boot partitions are /flash/P1 and /flash/P3. With this setting, when there is a module referring to the data in the ROM 102, it is preferable to constantly refer to the same mount path. The firmware update controller 201 accesses the paths /flash/P1 and /flash/P3 of the non-boot partitions to execute the update process. With this implementation, an adverse effect on running applications is suppressed.

Figure 4:
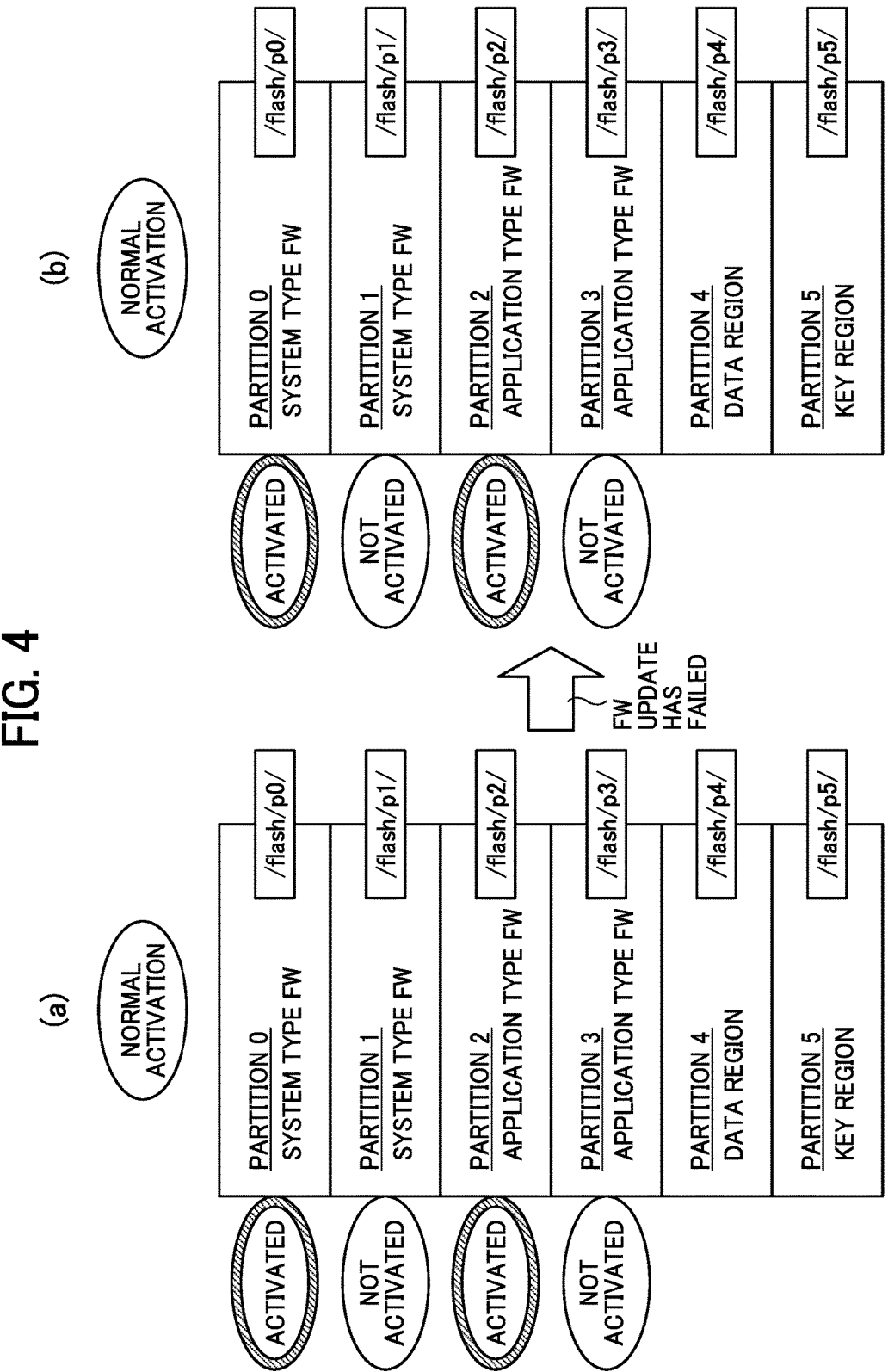
FIG. 4 is a diagram of exemplary boot partitions before and after an update process in a case where the update process of the firmware has failed.

FIG. 4 is a diagram illustrating states of the boot partitions and the non-boot partitions in a case where the firmware update has failed. In a case where a power interruption occurs due to a power failure and the like during the update process in the background and in a case where writing fails due to a device failure and the like, the update process is not normally completed. In a case where the update process is not normally completed, as described above, since the procedure does not reach the switching process, the switching process is not executed, and the boot partitions are not switched. Therefore, at the next activation, the image forming apparatus 100 can be activated without disadvantages with a partition same as the previous boot partition.

Figure 5:
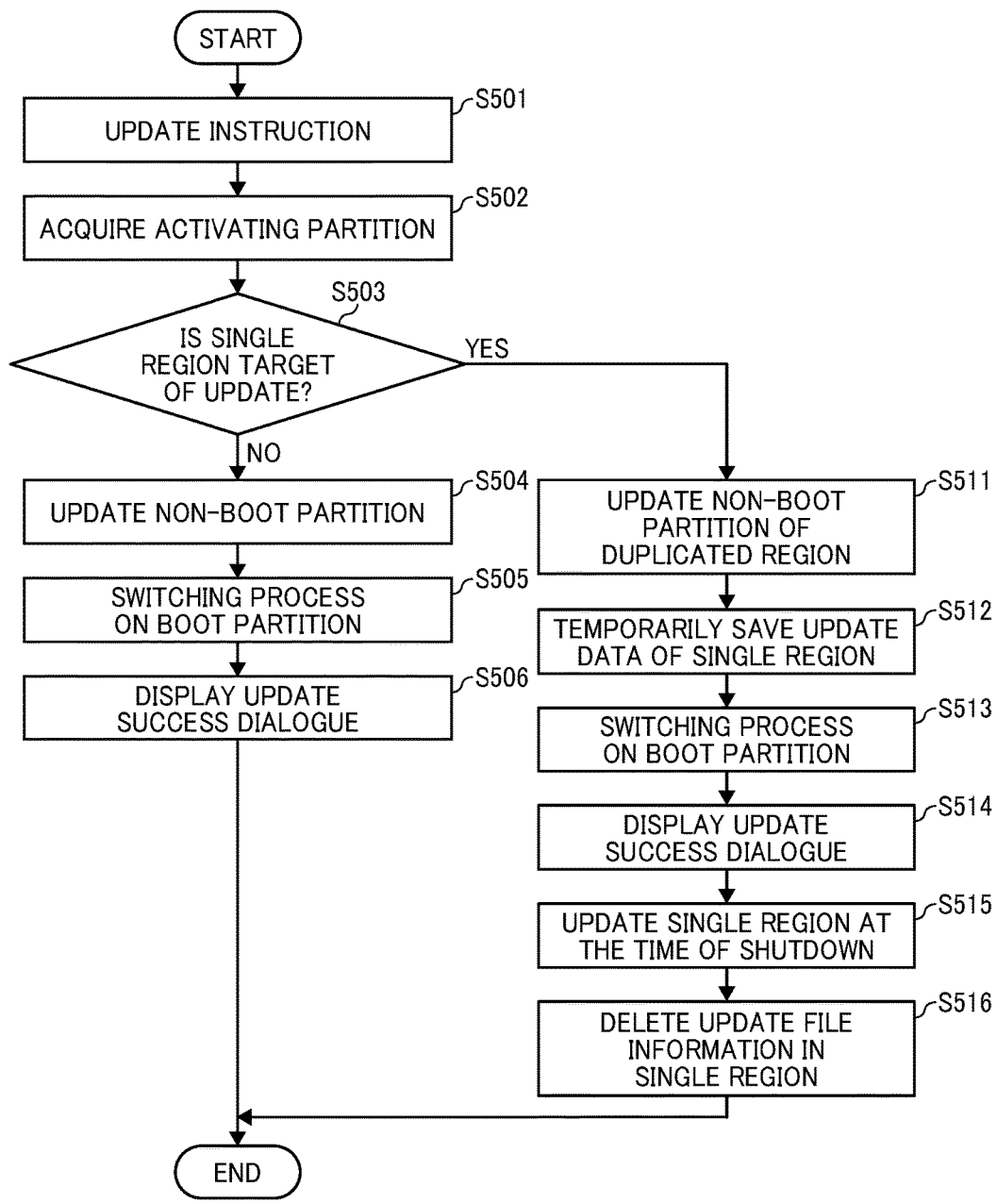
FIG. 5 is a flowchart illustrating operation of updating according to the first embodiment.

FIG. 5 is a flowchart of an exemplary operation of the update process. When receiving data for update from the SD card and the external server 150, or when receiving an update instruction from the user (S501), the firmware update controller 201 acquires information indicating the currently activating partition (S502). By referring to the switching data, the firmware update controller 201 acquires information indicating a partition used for activation. Next, the firmware update controller 201 determines whether a single partition such as a storage area storing a key is a target of the update (S503). This determination can be made, for example, by referring to a path name of the file to be updated included in the update file information 212.

In a case where the single partition is not the target of the update (S503: No), the firmware update controller 201 executes update process on the non-boot partition (S504). In the present embodiment, instead of rewriting and updating all data in the non-boot partition, a file which needs to be updated is rewritten. For example, in a case where the firmware for scan is a target of the update and the other firmware is not the target of the update, files regarding the firmware for scan are rewritten.

Figure 6:
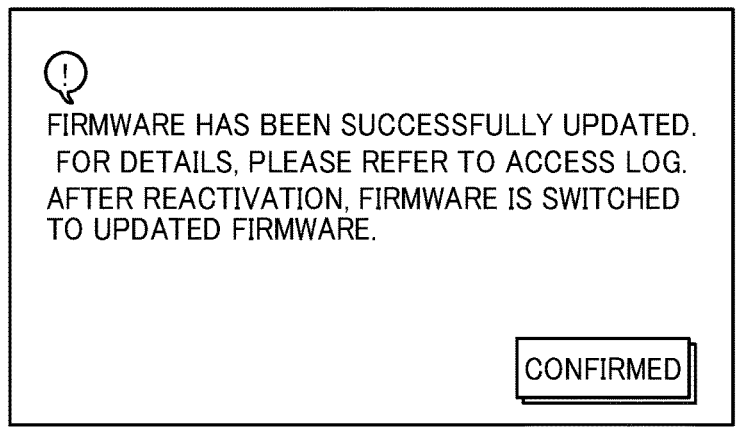
FIG. 6 is an illustration of an example screen displayed when the update process is completed.

After completion of the update, the firmware update controller 201 executes the switching process (S505) and switches the boot partition at the next activation. The firmware update controller 201 operates the operation controller 203 to notify that the update of the firmware has been completed and activation is performed with the updated firmware by an operation to reactivate the apparatus (S506). An exemplary display of the operation controller 203 at this time is illustrated in FIG. 6. The user confirms a dialogue illustrated in FIG. 6. When a confirmation button is pressed, the display returns to a normal menu screen and the like. A message illustrated in FIG. 6 may be displayed small in a prescribed display region in the menu screen.

In a case where the data to be updated includes the data of the single partition which is not duplicated (S503: Yes), the firmware update controller 201 updates the non-boot partition of the duplicated partition in the background (S511). Then, the firmware update controller 201 temporarily saves the update data of the single partitions 4 and 5 in the HDD 104 (S512). After the update in the background has been completed, the firmware update controller 201 executes the switching process (S513) to switch the partition to be activated next time. The firmware update controller 201 operates the operation controller 203 to notify that the update of the firmware has been completed and activation is performed with the updated firmware by an operation to reactivate the apparatus (S514). At this time, the user may be notified that the update process is continuously executed during the shutdown.

When the shutdown is started by the user's operation, the firmware update controller 201 executes the update process on the single partitions 4 and 5 which are not duplicated (S515). When the update process at the time of shutdown is normally completed, the firmware update controller 201 deletes the update data which has been temporarily stored in the HDD 104 (S516).

Figure 7:
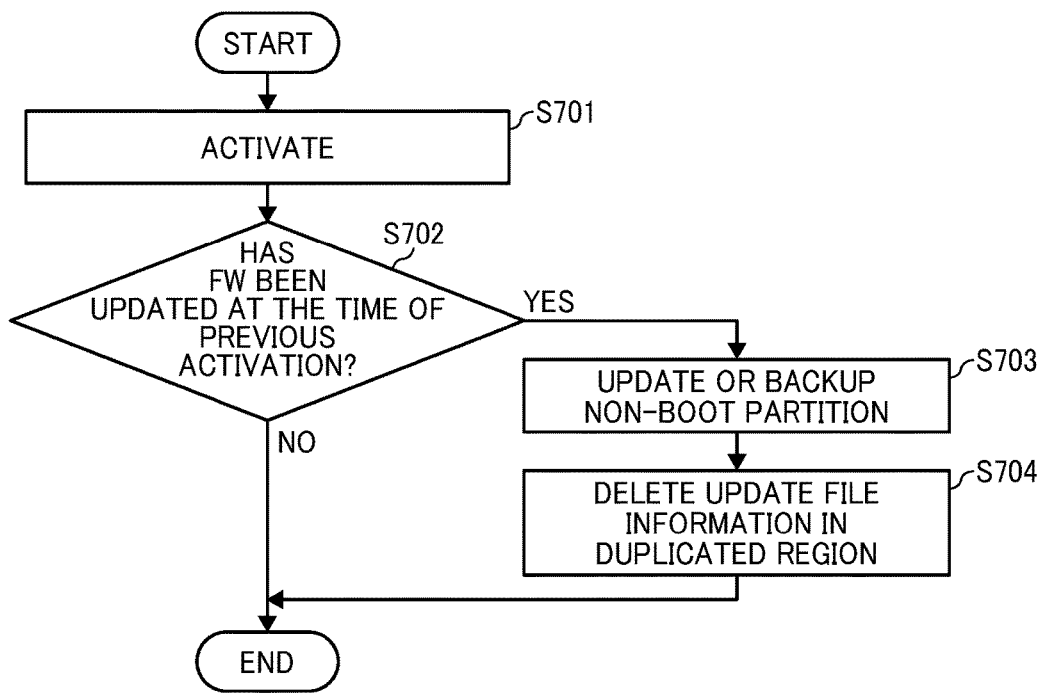
FIG. 7 is a flowchart illustrating operation to be performed in activating, according to the first embodiment.

FIG. 7 is a flowchart of an exemplary operation when the image forming apparatus 100 is activated. When the power supply is turned on, the power state controller 204 executes the activation process of the image forming apparatus 100 (S701). In S701, the power state controller 204 is activated with the partition indicated by the switching data.

When the activation process has been completed, the firmware update controller 201 determines whether the firmware is updated during the previous operation (S702). In a case where the update file information 212 regarding the duplicated partition exists, the firmware update controller 201 determines that the update process has been executed during the previous activation operation. Furthermore, when there is no update file information 212, the firmware update controller 201 determines that the update process has not been executed.

In a case where the firmware has been updated during the previous operation (S702: Yes), the firmware update controller 201 updates the firmware which has not been activated at this time with the file of the update file information 212 and executes a backup process (S703). In order to update, alternatively, the firmware update controller 201 may execute the backup process by overwriting the file of the update firmware which has been activated at this time on the firmware which has not been activated at this time. With one of the above operations, a version of the firmware of the non-boot partition which has not been activated at this time coincides with a version of the firmware of the partition which has been activated at this time, and both partitions are in the latest state. When the backup process has been completed, the update file information 212 for the duplicated partition is deleted (S704).

Here, an effect of the backup process in S703 will be described with reference to FIGS. 8A and 8B. A case where the application type firmware is updated is mentioned here, and two applications, i.e., a scan application and a FAX application are described as an example. The description is similarly applied to the system type firmware.

First, a case where the backup process is not executed will be described with reference to FIG. 8A. First, as illustrated in (a) of FIG. 8A, it is assumed that a version of the scan application be v1.1 and a version of the FAX application be v1.1.

In the present embodiment, as described above, the firmware which needs to be updated is updated, and the scan application and the FAX application can be individually updated. Here, for example, when the firmware update controller 201 updates the version of the FAX application of the non-boot partition 3 to v1.2 and performs reactivation, the state of the applications is changed to be the state in (b) of FIG. 8A. That is, the FAX application of the partition 3, of which the version has been upped to v1.2, is activated. On the other hand, the version of the FAX application of the non-boot partition 2 remains v1.1.

Figure 8A:
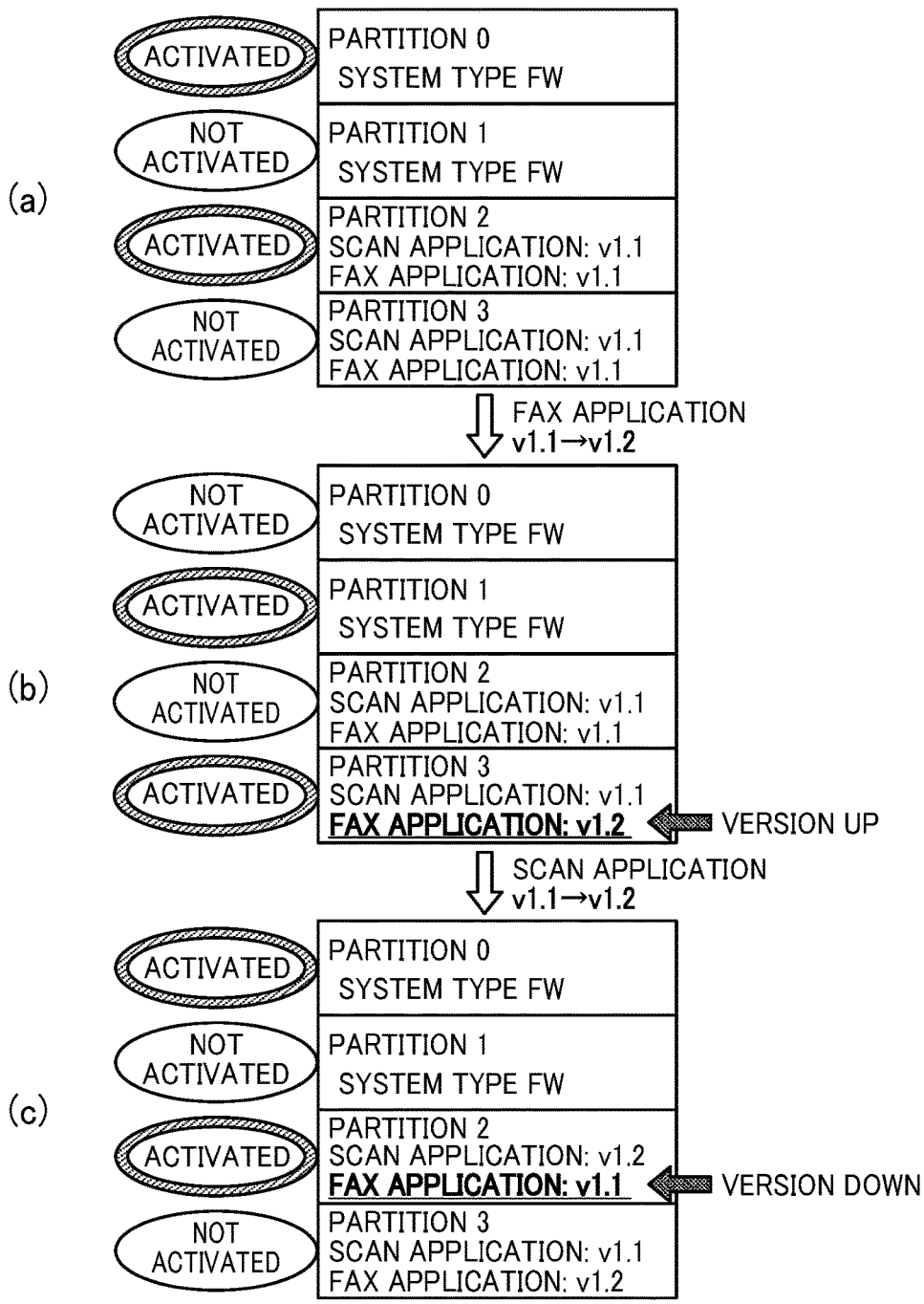
FIG. 8A is a diagram for explaining operation without a backup process according to a comparative example.
Figure 8B:
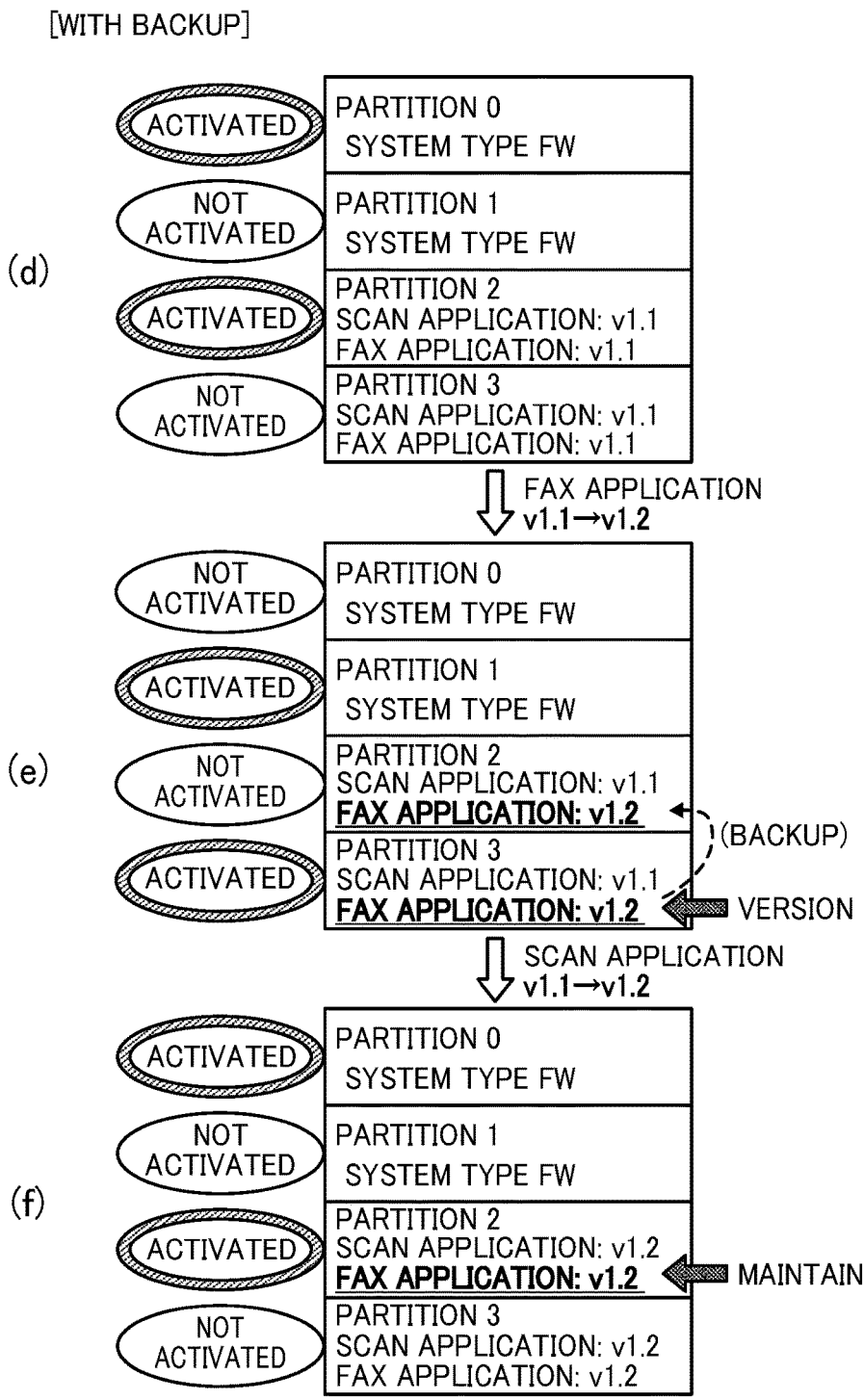
FIG. 8B is a diagram for explaining operation with a background process according to the first embodiment.

When the operation is performed in the state of (b) of FIG. 8A, and the update process of updating the version of the scan application from v1.1 to v1.2 is executed on the non-boot partition 2 next, and then, the reactivation is performed, the partitions are in the state of (c) of FIG. 8A. That is, the activation is performed in a state where the version of the FAX application is returned to the original version of v1.1. In this way, the partition which has been initially activated is not activated by an update process of first firmware, and then, the partition is subsequently activated by an update process of second firmware. At this time, the first firmware is activated in a state where the version is returned to the version before the update. This is because new firmware and old firmware are mixed in each of the duplicated partitions and the latest firmware is not maintained.

To avoid this, in the present embodiment, backup is performed to make the versions of the firmware in the boot partition and the firmware in the non-boot partition be the same. Examples of this case are illustrated in FIG. 8B The state in (d) of FIG. 8B is the same as the state of (a) of FIG. 8A, and the versions of the scan application and the FAX application are both v1.1. Here, the firmware update controller 201 updates the version of the FAX application of the non-boot partition 3 to v1.2 and executes reactivation. After the reactivation, the firmware update controller 201 backs up the FAX application of the partition 2 which is not activated at this time so that the version of the FAX application becomes v1.2. This state is illustrated in (e) of FIG. 8B. That is, the firmware update controller 201 makes the versions of the firmware of the boot partition and the firmware of the non-boot partition constantly be the same.

In the state of (e) of FIG. 8B, subsequently, the scan application of the non-boot partition 2 is updated to v1.2, and reactivation is performed, and the backup process is executed. Then, the state is changed to the state of (f) of FIG. 8B. Since the FAX application is backed up from the previous state of (d) of FIG. 8B to the state of (e) of FIG. 8B, version down does not occur, and the version is maintained to be v1.2, and the activation is performed with the partition 2. Furthermore, the version of the scan application is v1.2 in both of the boot partition and the non-boot partition by the backup process. In this way, by executing the backup process, even when the activation state and the non-activation state are repeatedly switched, the versions of the firmware in both partitions can be maintained to be the latest version. To enhance consistency of the versions, it is preferable that next firmware update is not accepted until the backup process is completed.

FIG. 9 is a flowchart of the operation to be performed after activation of the image forming apparatus, and illustrates an exemplary operation in consideration of a case where the shutdown is not normally executed due to a power failure and the like and the single partitions 4 and 5 are not normally updated.

When the image forming apparatus 100 is turned on (S901), the firmware update controller 201 determines whether the firmware update process has been executed during the previous operation (S902). In a case where the update process has not been executed (S902: No), the power state controller 204 performs activation (S903) and terminates the process.

On the other hand, in a case where the firmware update process has been executed during the previous operation (S902: Yes), the firmware update controller 201 determines whether the update of the single partitions 4 and 5 is completed (S904). When the update of the single partitions 4 and 5 are normally completed, as described in S516 in FIG. 5, the update file information 212 regarding the single partitions 4 and 5 is deleted. Accordingly, the firmware update controller 201 can determine whether the update process is not completed, depending on whether the update file information 212 regarding the partitions 4 and 5 remains.

In a case where the update process of the single partitions 4 and 5 has been completed (S904: Yes), the power state controller 204 executes the activation process (S905). Here, the partition which is not activated before the present time is activated first. Then, the firmware update controller 201 executes the backup process (S906).

In a case where the update process of the single partitions 4 and 5 is not completed (S904: No), the firmware update controller 201 executes the update process on the single partitions 4 and 5 at this stage (S907). When the update process is completed, the power state controller 204 executes the activation process (S908). Regarding the activation in S908, the partition which is not activated before the present time is activated first. In addition, the firmware update controller 201 deletes the remaining update file information 212 (S909) and executes the backup process (S910).

When the backup process has been completed, the update file information 212 for the duplicated partition is deleted (S911).

Figure 10:
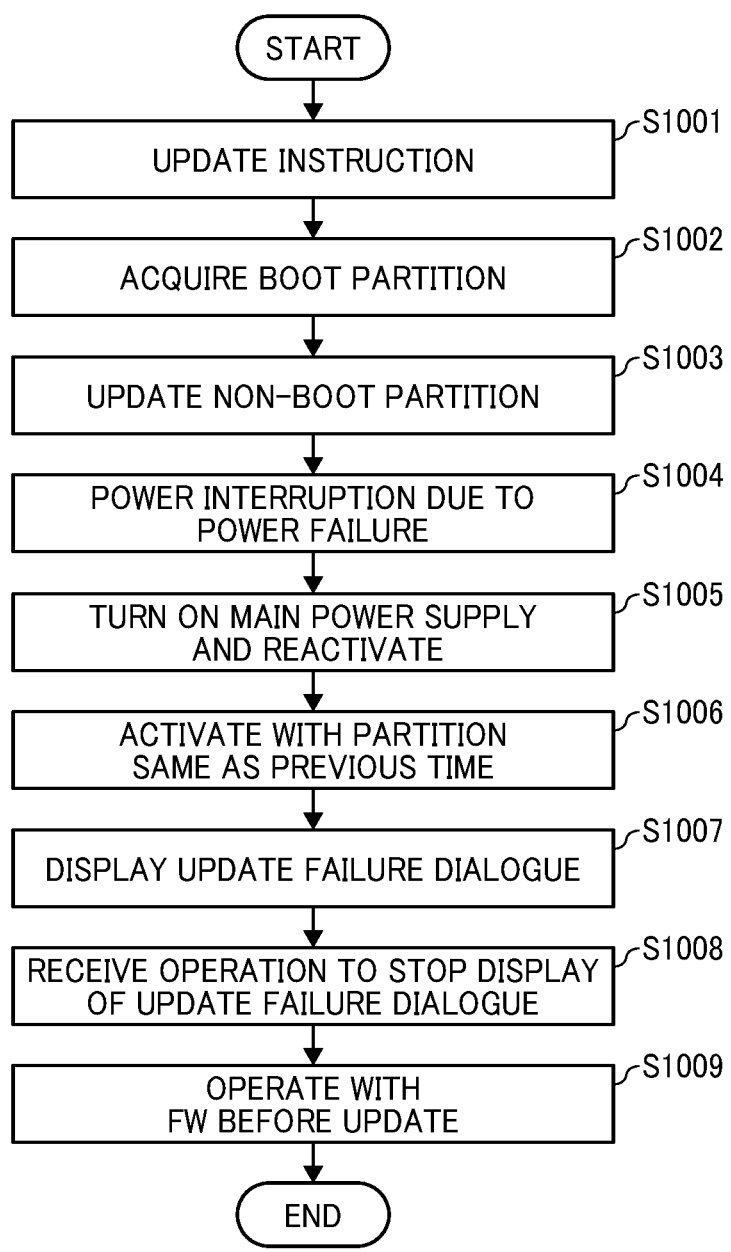
FIG. 10 is a flowchart illustrating operation of activating in an example case in which the update process has failed.

FIG. 10 is a flowchart of an exemplary operation when the update process has failed. In a substantially similar to operation of FIG. 5, when receiving an update instruction (S1001), the firmware update controller 201 acquires a boot partition (S1002), and then updates a non-boot partition (S1003).

During the update process, in a case where a power interruption occurs due to a power failure and the like (S1004), the reactivation is performed after the power supply, which has been accidentally turned off, is turned on again (S1005). The activation is again performed with the firmware same as the firmware which is used at the previous time (S1006). This is because the switching process has not performed, and therefore, the power state controller 204 has executed the activation process with the partition same as the previous time.

The firmware update controller 201 operates the operation controller 203 to display an update failure dialogue (S1007) to notify that the update process has not been normally completed. The firmware update controller 201 outputs a flag file immediately before the update process, and additionally performs an operation such as deleting the flag file when the update is normally completed so that the firmware update controller 201 can determine whether the update process has been normally completed or has failed based on the existence of the flag file.

Figure 11:
FIG. 11 is an illustration of an example screen displayed when the update process has failed.

FIG. 11 illustrates an exemplary dialogue displayed in S1007. In the present embodiment, a message indicating that the update has failed and the apparatus can be continuously used is displayed. When the confirmation button illustrated in FIG. 11 is pressed (S1008), the apparatus becomes available with the same firmware as before (S1009). At this time, in response to a user instruction, the update operation may be performed again to execute the above-described firmware update process. When the confirmation button illustrated in FIG. 11 is pressed, the display returns to the normal menu screen and the like. Alternatively, the message illustrated in FIG. 11 may be displayed small in the prescribed region in the menu screen.

Figure 12:
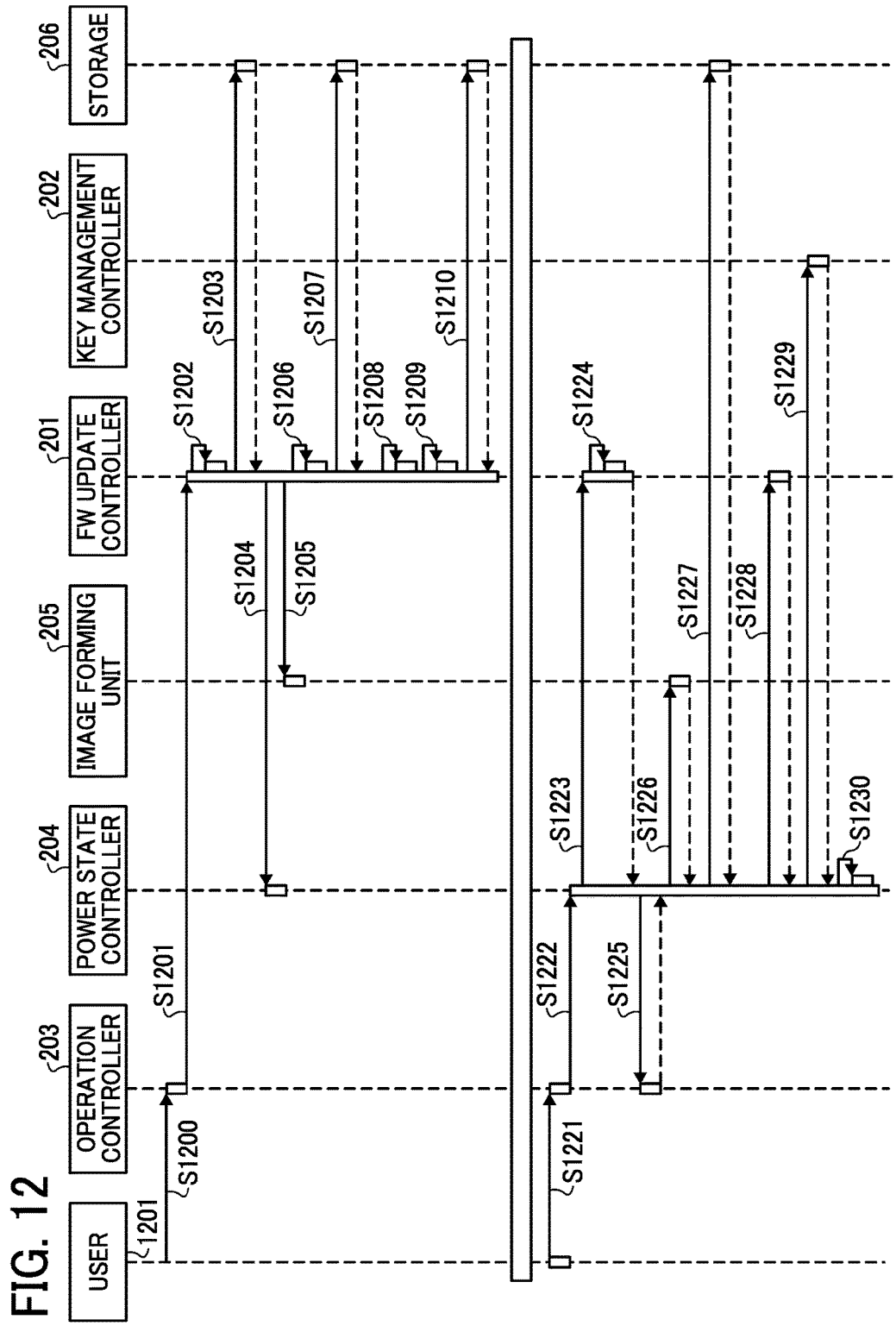
FIG. 12 is a sequence diagram illustrating operation of updating according to the first embodiment.
Figure 13:
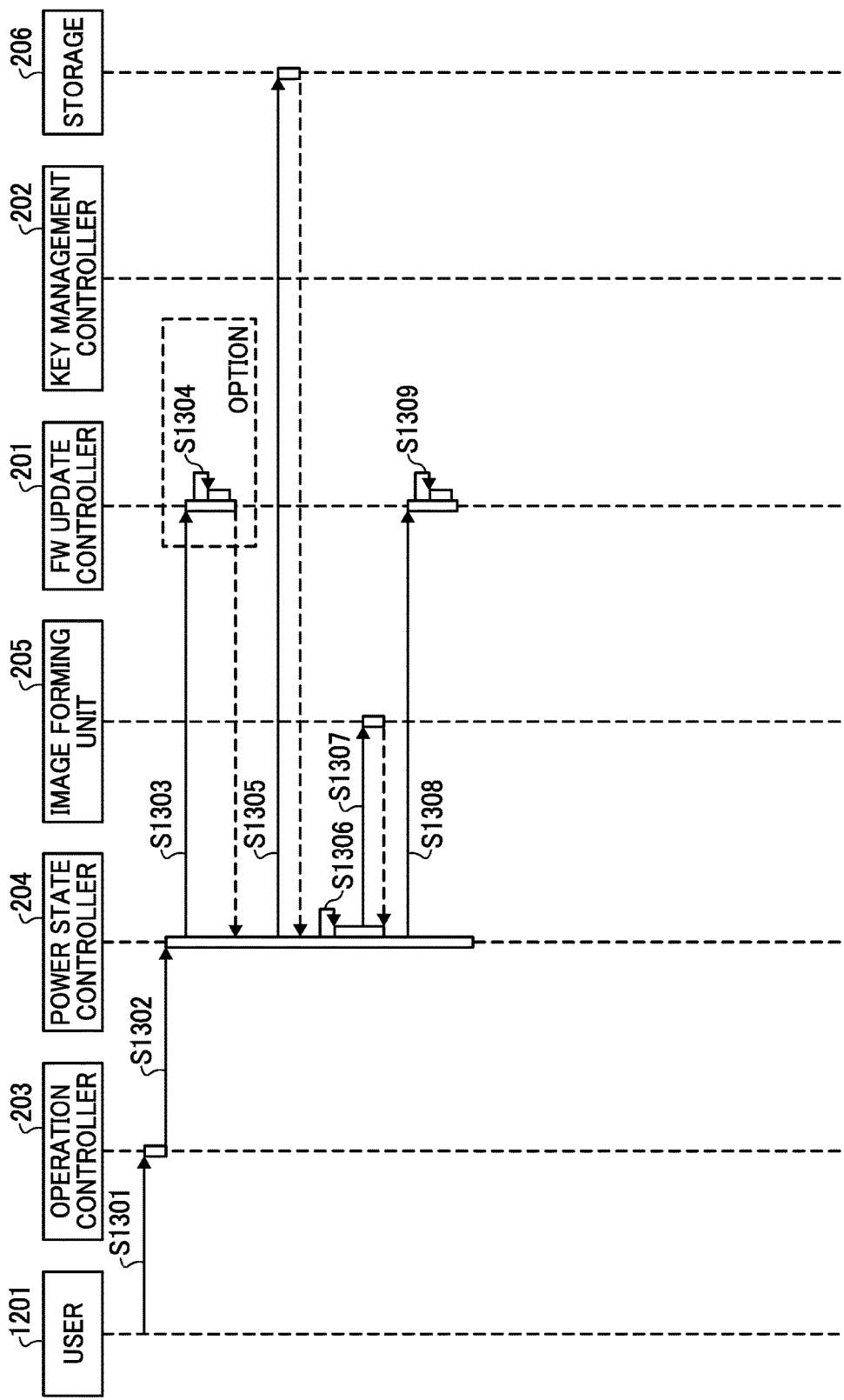
FIG. 13 is a sequence diagram illustrating operation of updating according to the first embodiment.

FIGS. 12 and 13 are sequence diagrams illustrating the operation of the update process. When the user inserts the SD card storing the firmware (S1200) and the operation controller 203 detects the SD card (S1201), the firmware update controller 201 acquires data for update from the SD card. Since the data for update is a compressed file, the firmware update controller 201 extracts the file (S1202) and stores the file in the storage 206 (S1203). An extraction destination includes the HDD 104 and the like. As a result, the update file information 212 and the key information 213 are acquired.

The firmware update controller 201 notifies the power state controller 204 and the image forming unit 205 of the update of the firmware (S1204 and S1205). Conventionally, this operation has prevented the execution of jobs and transition of the mode to the power saving mode. However, in the present embodiment, since the update process is executed in the background, the notification is performed without limitation.

The firmware update controller 201 verifies the update file information 212 and the key information 213 (S1206). Here, the firmware update controller 201 operates the key management controller 202 to verify the signature to verify whether the data for update is authentic and to confirm model information, destination information, and connected device information.

The firmware update controller 201 acquires identification information of the currently activated partition referring to the switching data to determine the non-boot partition (S1207). The firmware update controller 201 executes the update process on the non-boot partition based on the update file information 212 (S1208).

When the update process has been completed, the firmware update controller 201 verifies whether the data has been normally written (S1209). In a case where the verification result indicates that the data has been appropriately written, the firmware update controller 201 executes the switching process so as to be activated with the current non-boot partition at the time of next activation (S1210).

The processing in S1201 to S1202 is performed according to the user's operation and the acquisition of the file for update as a trigger. However, the processing in S1203 to S1210 is executed in the background without affecting the user's operation, a device state, and the execution of the job.

Next, a shutdown operation of the image forming apparatus 100 will be described. The operation controller 203 detects an operation of a main power supply key by the user and outputs a power off signal to the power state controller 204 (S1221 and S1222). The power state controller 204 notifies the firmware update controller 201 of the start of shutdown (S1223). The firmware update controller 201 executes the update process on the partition 4 of the data region and the partition 5 of the key region (S1224). This process is executed when the region is an update target, such as a case where the key information 213 exists.

After the update process, the power state controller 204 executes the shutdown process on the operation controller 203, the image forming unit 205, the storage 206, the firmware update controller 201, and the key management controller 202 (S1225 to S1229). The power state controller 204 shuts down itself (S1230). Accordingly, the image forming apparatus 100 is normally terminated and is turned off.

FIG. 13 is a sequence diagram illustrating an operation of the image forming apparatus 100 at the time of activation. The operation controller 203 detects an operation of a main power supply key by the user and outputs a power on signal to the power state controller 204 (S1301 and S1302). The power state controller 204 notifies the firmware update controller 201 of the start of the activation (S1303). The firmware update controller 201 determines whether the key information 213 exists and the update file information 212 regarding the single partitions 4 and 5 exists to determine whether the update at the time of shutdown is normally completed. Here, in a case where the update is not normally completed, the update process is executed on the partition 4 of the data region and the partition 5 of the key region (S1304).

The power state controller 204 which has received a completion notification from the firmware update controller 201 determines a boot partition by referring to the switching data (S1305), and executes the activation process with the partition (S1306 and S1307). The power state controller 204 notifies the firmware update controller 201 that the normal activation has been performed (S1308). The firmware update controller 201 which has received this notification executes the backup process, and makes the versions of the firmware in the current boot partition and the non-boot partition be latest (S1309).

Figure 14:
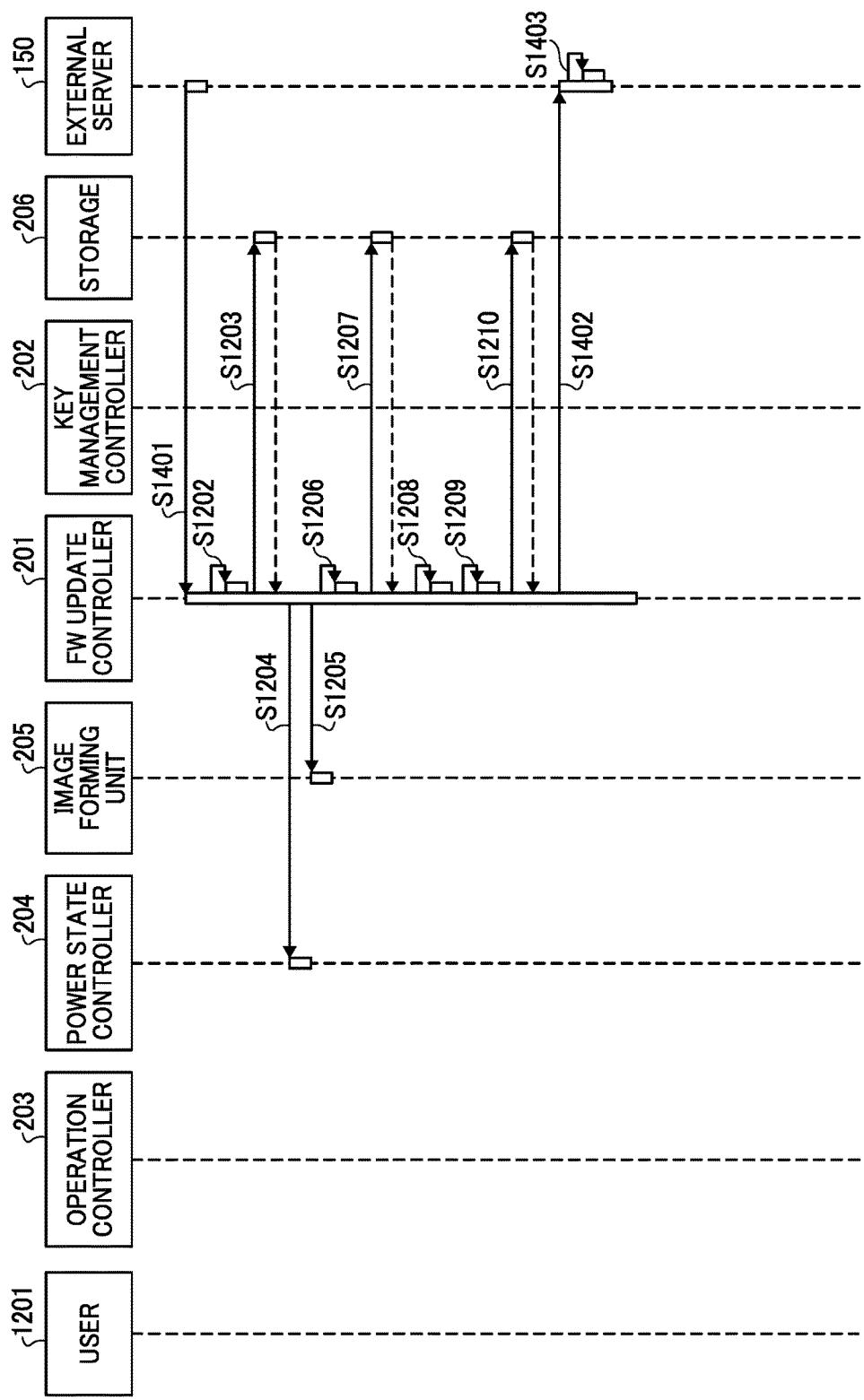
FIG. 14 is a sequence diagram illustrating operation of updating according to the first embodiment.

FIG. 14 is a sequence diagram illustrating an update process in a case where the data for update is acquired from the external server 150. In a case where the data for update exists, the external server 150 transmits the data for update to the image forming apparatus 100 (S1401). In the present embodiment, a push type data distribution method is employed in which the external server 150, which transmits data, actively transmits data. There are cases where push type data transmission does not work in a case where communication is restricted by a firewall or under a network environment where network address translation (NAT) is provided. In such a case, a pull type data distribution method may be used in which the image forming apparatus 100 actively retrieves data.

The subsequent processing from S1202 to S1210 is performed as described above referring to the processing from S1202 to S1210 illustrated in FIG. 12. When the update process has been completed, the firmware update controller 201 transmits an update completion notification to the external server 150 (S1402). The external server 150 which has received the update completion notification outputs logs and rewrites management data (S1403). It is preferable to execute processing in S1402 and S1403 at the next activation of the image forming apparatus 100.

The image forming apparatus according to the present embodiment duplicates the firmware in the ROM to update the non-boot partition in the background without stopping the operation of the apparatus. Furthermore, the image forming apparatus according to the present embodiment executes the switching process after the update process has been normally completed. Therefore, in a case where the update process has failed or in a case where a power interruption occurs due to a power failure and the like during the update process, the switching process is not executed. Therefore, the image forming apparatus is activated with the same partition as before, even after the reactivation. As a result, the image forming apparatus is normally activated in a state before the update.

Since the image forming apparatus used in an office and the like is used by a large number of users, the stop of the operation due to the update process causes a large effect. By executing the update process in the background without stopping the operation as in the present embodiment, availability of the apparatus is enhanced, and the apparatus can be easily maintained.

As described above, an apparatus according to the present embodiment includes a storage divided into a plurality of partitions. Furthermore, in the apparatus according to the present embodiment, two or more partitions storing the same firmware are provided and multiplexed. At the time of activation, the apparatus is controlled to activate with any one of the partitions. With this operation, even if a defect occurs in this boot partition, the apparatus can be activated by using other partition.

Furthermore, when the firmware is updated, in the present embodiment, an update process is executed to a partition which is not activated, not the partition to be activated. In the embodiment, the partition to be activated is switched so as to activate the apparatus with the updated partition at the time of next activation. In the present embodiment, it is unnecessary to rewrite the firmware of the partition to be activated while the apparatus is in operation, and the firmware can be updated without stopping the apparatus. When a power interruption occurs due to an update failure or a power failure, the activation is performed with the partition which has been used for activation so far. As a result, it is possible to operate the apparatus as usual in a state before the update.

In the above embodiment, the single partition is updated at the time of shutdown and at the time of activation. However, it is preferable to update the single partition when the image forming apparatus 100 is not used. The time of shutdown and the time of activation are one aspect of the time when the image forming apparatus 100 is not used. Furthermore, regarding the update process of the single partition, it has been mentioned that the update data is temporarily stored in a nonvolatile storage device such as the HDD 104 to keep the update data even when the apparatus is reactivated.

In this embodiment, an implementation to automatically update and reactivate the apparatus after a certain period of time may be added to the firmware update controller 201. Furthermore, an implementation to confirm the automatic update and reactivation after a certain period of time, for example, to the external server 150 may be added to the firmware update controller 201. In addition, an implementation to enable to change an update time by an instruction from the external server 150 or a user's operation may be added to the firmware update controller 201.

In the above, an exemplary implementation to duplicate the partition has been mentioned. However, the embodiment can be implemented by equal to or more than double multiplexing. A plurality of partitions may be provided for a single storage device, or a plurality of partitions may be provided for a plurality of storage devices. Furthermore, without dividing the configuration with the partitions, if a plurality of single storage devices is provided, the plurality of storage areas is provided. With this configuration, the embodiment can be implemented. In addition, in the present embodiment, "duplicate" or "multiplexing" has been mentioned. However, it is preferable to use the descriptions of "double-sided", "multi-sided", "two regions", and "a plurality of storage areas".

It is preferable that the storage may be a single piece of hardware (ROM or HDD) or a plurality of pieces of hardware (ROM or HDD).

Figure 15:
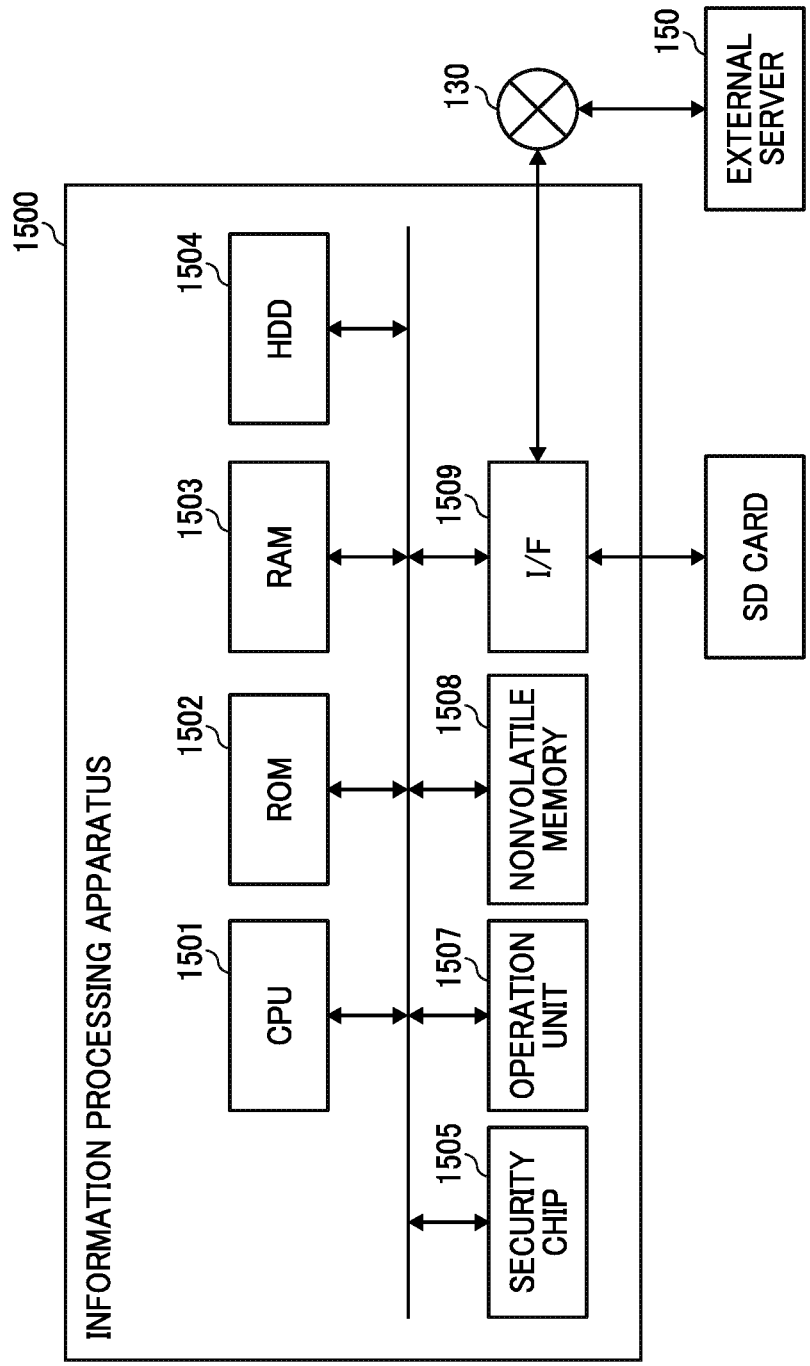
FIG. 15 is a schematic diagram illustrating a hardware configuration of an information processing apparatus according to the first embodiment.
Figure 16:
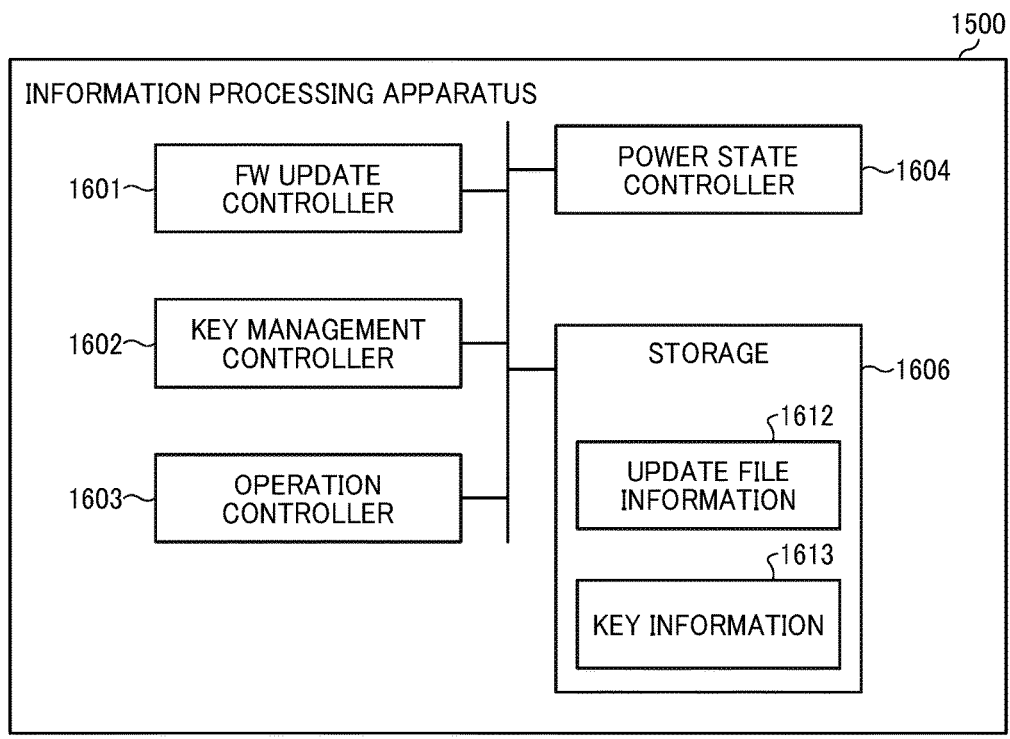
FIG. 16 is a schematic diagram illustrating a functional configuration of the information processing apparatus according to the first embodiment.

The above aspect of the present embodiment can be applied to an information processing apparatus such as a general-purpose computer. Referring to FIG. 15, an information processing apparatus 1500 includes a CPU 1501, a ROM 1502, a RAM 1503, an HDD 1504, a security chip 1505, an operation unit 1507, a nonvolatile memory 1508, and an I/F 1509. Each hardware illustrated in FIG. 15 is similar to the hardware illustrated in FIG. 1. FIG. 16 illustrates a functional configuration of the information processing apparatus 1500. The information processing apparatus 1500 includes a firmware update controller 1601, a key management controller 1602, an operation controller 1603, a power state controller 1604, and a storage 1606. The storage 1606 stores update file information 1612 and key information 1613. Each of functional block and the data have functions similar to those illustrated in FIG. 2, and can perform operations similar to those described above. The information processing apparatus 1500 illustrated in FIGS. 15 and 16 has a partition configuration illustrated in FIG. 3. As in the above, the information processing apparatus 1500 can execute the update process and the switching process in the background and can display a message.

As detailed above, the partitions are multiplexed and the firmware is updated in the background relative to the non-boot partition so that the apparatus can be used as usual during the firmware update.

Referring now to FIGS. 17 to 24, an image forming apparatus 100A is described according to a second embodiment. In the above-described embodiment, after the firmware is updated, various data including set values or user data, which may be referred to as setting data, is updated. This, however, requires a longer time to complete updating both firmware and setting data.

In this embodiment, update of firmware and update of setting data are performed concurrently, thus reducing a time for updating. The following illustrates an example case in which an old image forming apparatus is replaced with a new one and transfer of data is performed. However, update of firmware and update of setting data may be performed at any desired time, such as when the image forming apparatus is newly installed, or when firmware and setting data of the exiting image forming apparatus is updated.

Figure 17:
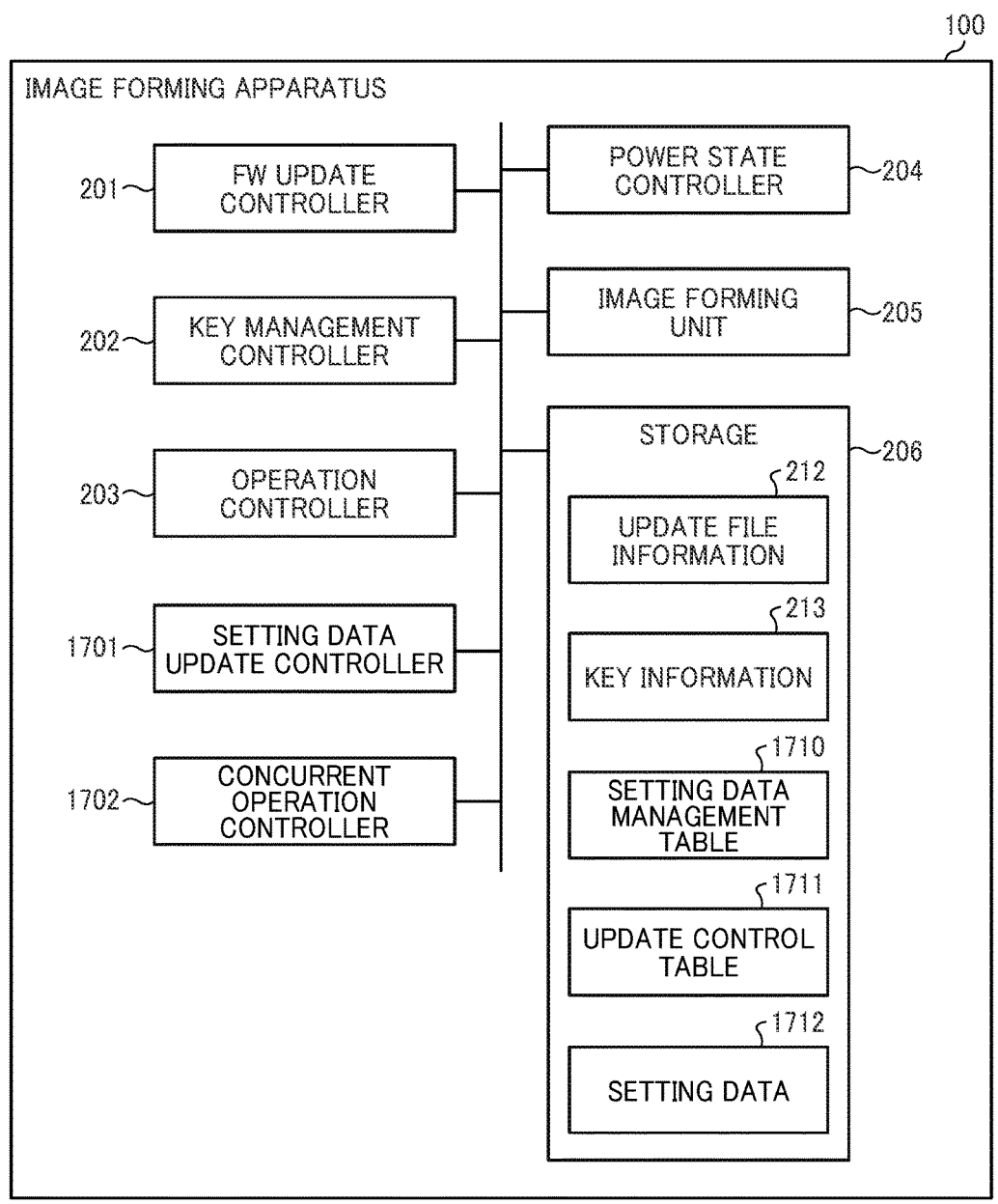
FIG. 17 is a schematic block diagram illustrating a functional configuration of the image forming apparatus according to a second embodiment.

FIG. 17 is a schematic block diagram illustrating a software configuration of the image forming apparatus 100A according to a second embodiment. It is assumed that the image forming apparatus 100A of FIG. 17 has a hardware configuration that is similar to the image forming apparatus 100 of the first embodiment illustrated in FIG. 1. The image forming apparatus 100A of FIG. 17 includes, in addition to the functional units described above for the first embodiment, a setting data update controller 1701 and a concurrent operation controller 1702. The storage 206 further includes a setting data management table 1710, an update control table 1711, and setting data 1712.

The setting data update controller 1701, which is implemented by the CPU 101, updates the setting data. Specifically, in order to synchronize update of setting data with update of firmware, the setting data update controller 1701 inquiries, for each phase, the concurrent operation controller 1702 whether update processing is executable, and performs update processing when update processing is executable.

The concurrent operation controller 1702 controls concurrent operation of updating of firmware and updating of setting data. For example, when firmware for the scanner and setting data for the entire hardware are to be updated at a same time, contents of data may become inconsistent. On the other hand, even when firmware for the scanner and setting data for an operation screen, which is not related to the scanner, are to be updated at a same time, such problem in data inconsistency is not caused. That is, there are a combination of processes that can be performed concurrently, and a combination of processors that should not be performed concurrently. The concurrent operation controller 1702 controls updating of the firmware and updating of the setting data, such that these processes are concurrently performed while maintaining synchronization between these processes, to enhance productivity. The concurrent operation controller 1702 performs control according to the setting data management table 1710 and the update control table 1711 stored in the storage 206.

The concurrent operation controller 1702 refers to the setting data management table 1710 and the update control table 1711 when updating, which will be described later. The setting data 1712 is provided from the SD card or the external server 150 (FIG. 1), for example, with the update file information 212 and the key information 213, and temporarily stored in the storage 206. The setting data 1712 includes list data that lists, for each setting data to be updated, setting data itself, and information regarding the setting file such as a name or path of the setting file. In the first embodiment, the update file information 212 includes setting data such as control data. In the second embodiment, the setting data is provided separately from the update file information 212, as the setting data 1712.

The firmware update controller 201 in the second embodiment operates in cooperation with the concurrent operation controller 1702.

Specifically, in the second embodiment, the firmware and the setting data are each classified, by a type of hardware to be updated. Specifically, the hardware is classified into engine, controller, and operation unit.

The engine is a group of driver software that directly controls hardware such as a plotter, a scanner and a finisher, and corresponds to system firmware in the first embodiment. The controller is a group of software programs that implement such as a copy function and a printer function of the image forming apparatus 100, and corresponds to application system firmware in the first embodiment. The operation unit is a group of software programs that control operation related to display of an image and user operation, and corresponds to a Web server program and a browser program in case the Web-based display control is performed.

Examples of the setting data for engine include, but not limited to, a sheet transfer speed, a toner output amount, a scanner moving speed for scanning a sheet, and a value defining a timing for transferring a sheet from the main unit of the image forming apparatus to a finisher. Examples of the setting data for controller include, but not limited to, various default values to be used for copying or printing (a type of printing to indicate monochrome printing or color printing, a sheet size, an enlargement or reduction ratio, a resolution, etc.), and various image processing set values to be used for forming an image onto a recording sheet. The setting data for the operation unit include, but not limited to, image data for buttons or icons to be displayed by the operation controller 203, data indicating a display size and an arrangement of an entry field or the button.

FIG. 18 illustrates an example of the setting data management table 1710. For the descriptive purposes, data stored in the table 1710 is expressed in the form of a character string such as "engine" and "none", the table 1710 may store numerical data or a code that is previously determined in each data field.

The setting data management table 1710 is used to manage various setting data to be updated. The setting data management table 1710 stores, for each setting data, an identifier (set value number), a set value storage area (specifically, a name of a directory or a folder where the set value is stored), and a device that uses the setting data, in association with one another. The concurrent operation controller 1702 executes updating, such that the setting data storage area, operation of the device using the setting data, and the set value that is changeable (FIG. 19) dot not overlap. The setting data management table 1710 stores, for each setting data, information indicating items that may be affected by updating of the setting data.

For example, referring to the second record counted from the top (with the set value number of SP1-180-020), this setting data is stored in a folder for engine, and may affect operation of the scanner as the scanner uses that setting data. In case this setting data is to be updated, the concurrent operation controller 1702 prohibits updating of the firmware stored in the folder for engine, and prohibits use of the scanner. While this setting data is being updated, the user is prohibited from performing scanning, copying, or fax transmission, each requiring the use of scanner. On the other hand, the user is allowed to perform operation of printing print data that is received via a network, which does not require the use of scanner.

In another example, referring to the fifth recorded counted from the top (with the set value number of SP5-552-785), this setting data is stored in a storage area for controller, and does not affect any hardware. In case this setting data is being updated by the concurrent operation controller 1702, the user is allowed to perform copying, printing, or scanning.

FIG. 19 illustrates an example of the update control table 1711. For the descriptive purposes, data stored in the table 1711 is expressed in the form of a character string, the table 1711 may store numerical data or a code that is previously determined in each data field.

The update control table 1711 defines, for each firmware, operation that is allowed or not allowed to be performed during updating of the firmware. The update control table 711 stores, for each firmware, a name of the firmware (update target FW), a device storing the firmware (DEVICE STORING FW), a changeable set value, information indicating whether panel operation is allowed during updating (panel operation during updating), and an operable device during updating, in association with one other.

The changeable set value is data (first data) that indicates whether updating is allowed or not allowed, concurrently with updating of this updating program. For example, in case the firmware for "controller system" (the first record counted from top) is being updated, all set values can be updated concurrently with updating of the firmware for "controller system". In another example, in case the firmware for "operation system" (the eighth record counted from top) is being updated, setting data for the operation unit is prohibited from updating, at least concurrently with updating of the firmware for "operation system". Further, in case the firmware for "operation system" is updated, reactivation is required.

The "panel operation during updating" item indicates whether the operation controller 203 can be used, at least temporarily, during updating of the firmware. In case the firmware, with the value "not allowed" of the "panel operation during updating" item, is updated, the user is not allowed to perform operation on the operation controller 203.

The "operable device during updating" item indicates hardware that is operable, at least temporarily, during updating of the firmware. During updating of the firmware, the user is prohibited from operating any device other than the "operable device". For example, in case the firmware for "plotter" (the third record counted from bottom) is being updated, the user is allowed to perform operation on the operation controller 203, but prohibited from operating the plotter and scanner. That is, the user is allowed to configure various settings for copying using the operation controller 203, but not able to execute copying as this requires the plotter and scanner.

Figure 20:
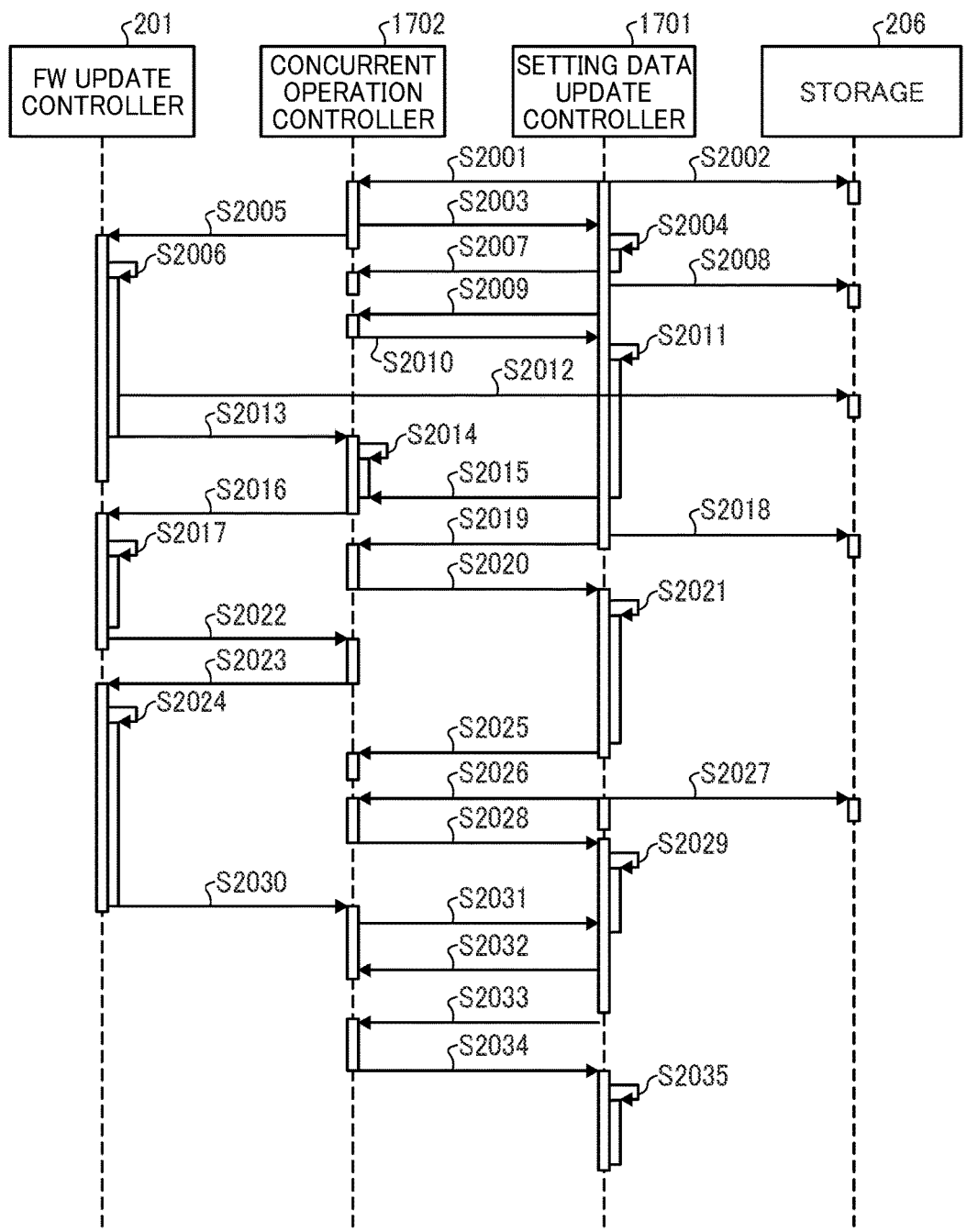
FIG. 20 is a sequence diagram illustrating operation of updating, according to the second embodiment.

FIG. 20 is a data sequence diagram illustrating operation performed by the image forming apparatus 100A according to the second embodiment. In this embodiment, the firmware for controller, firmware for operation unit, and firmware for engine are updated in this order. The setting data for engine, setting data for operation unit, and setting data for controller are updated in this order. For updating the setting data, transfer of address books is also performed. For simplicity, the controller system, the operation system, and the plotter, each illustrated in FIG. 19, are subjected for updating, respectively as hardware of the controller, operation unit, and engine.

In prior to performing operation of FIG. 20, the operation controller 203 displays a screen as illustrated in FIG. 21. The screen of FIG. 21 is an example screen, which requests a user to select from: updating only the setting data, updating only the firmware, and updating both of the setting data and the firmware. When the user selects a button 2101 to perform updating of the setting data and the firmware, the operation of FIG. 20 is performed.

The setting data update controller 1701 sends an inquiry to the concurrent operation controller 1702, which inquires whether the setting data for engine can be updated (S2001), and obtains the setting data for engine from the storage 206 (S2002).

The concurrent operation controller 1702, which receives the inquiry, determines a specific firmware that is being updated by the firmware update controller 201. The concurrent operation controller 1702 stores, in real time, a name of firmware being updated by the firmware update controller 201 ("update target FW" in FIG. 19), and an identifier of setting data being updated by the setting data update controller 1701 (set value number of FIG. 18). The concurrent operation controller 1702 determines based on these items being stored, and changeable set values in FIG. 19. Since the firmware update controller 201 is not performing updating at S2001, the concurrent operation controller 1702 sends a response indicating that updating is allowed to the setting data update controller 1701 (S2003).

The setting data update controller 1701, which receives the response, starts updating of the setting data for engine (S2004). While the setting data update controller 1701 is updating the setting data for engine, the concurrent operation controller 1702 sends an instruction for updating firmware for controller, to the firmware update controller 201 (S2005). The firmware update controller 201, which receives the instruction for updating, starts updating the firmware for controller (S2006).

After completing updating of the setting data for engine, the setting data update controller 1701 sends a notification indicating completion of updating to the concurrent operation controller 1702 (S2007), and proceeds to updating of setting data for operation unit. The setting data update controller 1701 obtains the setting data for operation unit, to be used for updating, from the storage 206 (S2008), and sends an inquiry to the concurrent operation controller 1702 to inquiry whether updating is allowed (S2009).

The concurrent operation controller 1702 obtains changeable set values in the update control table 1711, and determines whether updating of the firmware for controller that is being performed, and updating of the setting data for operation unit, can be concurrently performed. Since the changeable set value for the firmware for controller system has the value "all" in FIG. 19, the concurrent operation controller 1702 sends a response indicating that updating is allowed to the setting data update controller 1701 (S2010). The setting data update controller 1701 starts updating of the setting data for operation unit (S2011).

During updating of the setting data for operation unit, the firmware update controller 201 performs desired operation such as switching operation (refer to the first embodiment) (S2012). When updating is completed, the firmware update controller 201 sends a notification indicating completion of updating of the firmware for controller, to the concurrent operation controller 1702 (S2013).

In order to proceed to updating of the firmware for operation unit, the concurrent operation controller 1702 obtains changeable set values in the update control table 1711. AT this time, updating of the setting data for operation unit is being performed (S2011), and the changeable set value for the firmware for operation system (subjected for updating) is set with a value indicating that concurrent operation with updating of the setting data for operation unit is prohibited. Accordingly, the concurrent operation controller 1702 waits until updating of the setting data for operation unit, which is being performed, is completed (S2014).

The concurrent operation controller 1702 then receives a notification indicating completion of updating of the setting data for operation unit, from the setting data update controller 1701 (S2015). In response to such notification, the concurrent operation controller 1702 sends an instruction for starting updating of the firmware for operation unit, to the firmware update controller 201 (S2016). The firmware update controller 201, which receives the instruction, starts updating of the operation unit (S2017).

The setting data update controller 1701 proceeds to update the setting data for controller. The setting data update controller 1701 obtains the setting data for controller from the storage 206 (S2018), and sends an inquiry for updating to the concurrent operation controller 1702 (S2019). Updating of the setting data for controller, and updating of the firmware for operation unit (operation system) being currently performed, can be performed concurrently according to the changeable set values in FIG. 19. Accordingly, the concurrent operation controller 1702 sends a response indicating updating is allowed (S2020). The setting data update controller 1701, which receives the response, starts updating of the setting data for controller (S2021).

When updating of the firmware for operation unit is completed, the firmware update controller 201 sends a notification indicating completion of updating to the concurrent operation controller 1702 (S2022). In order to continue to update the firmware for engine, the concurrent operation controller 1702 refers to changeable set values in the update control table 1711. Updating of the setting data for controller is being currently performed (S2021), and the changeable set value indicates that updating of the firmware for engine (plotter) and importing of setting data for controller can be concurrently performed. Accordingly, the concurrent operation controller 1702 sends an instruction for updating the firmware for engine, to the firmware update controller 201 (S2023). The firmware update controller 201, which receives the instruction, starts updating the firmware for engine (S2024).

During updating of the firmware for engine is being performed by the firmware update controller 201, the setting data update controller 1701 sends a notification indicating completion of the setting data for controller (S2025). The setting data update controller 1701 sends an inquiry that inquires whether importing of address books is allowed, to the concurrent operation controller 1702 (S2026), and further obtains data of the address books from the storage 206 (S2027). The update control table 1711 is not set with information indicating whether to allow importing of address books is allowed or not. Accordingly, the concurrent operation controller 1702 sends a response indicating importing of address books is allowed (S2028). The setting data update controller 1701, which receives the response, starts updating of address books (S2029).

During updating of the address books, the concurrent operation controller 1702 receives a notification indicating completion of updating of the firmware for engine, from the firmware update controller 201 (S2030). Since updating of the firmware is all completed, the concurrent operation controller 1702 sends a notification indicating completion of updating for all firmware subjected for updating, to the setting data update controller 1701 (S2031).

When importing of address books is completed, the setting data update controller 1701 sends a notification indicating completion of importing, to the concurrent operation controller 1702 (S2032), and further sends an inquiry whether reactivation is allowed (S2033). Since updating of the firmware is completed, the concurrent operation controller 1702 sends a response indicating that reactivation is allowed (S2034). The setting data update controller 1701, which receives the response, reactivates the system (S2035). In this embodiment, the setting data update controller 1701 performs reactivation, however, the power state controller 204 may perform reactivation as described above for the first embodiment.

When a main power switch is pressed, during when updating of the setting data and/or updating of the firmware is being performed, the setting data update controller 1701 performs reactivation after all updating processes are completed, according to an instruction from the concurrent operation controller 1702. In case the power supply is interrupted due to, for example, an electric power outage, the remaining process is performed after the power supply is restored.

FIG. 22 is a diagram illustrating examples of a dialogue, displayed by the operation controller 203, when updating operation of FIG. 20 is being performed. The operation controller 203 displays this dialogue, smaller in size, at a specific location in the menu screen. The concurrent operation controller 1702 changes display contents of the dialogue, every time completion of updating of the setting data is received from the setting data update controller 1701 or completion of updating of the firmware is received from the firmware update controller 201. With this dialogue, the user instantly knows the current progress in updating.

FIG. 23 is an illustration of an example screen, which requests the user to wait for entire processing to be completed, when either updating of the firmware or updating of the setting data has been completed. If the user chooses to wait, updating processing continues. If the user chooses not to wait, processing is interrupted. When interrupted, data in the image forming apparatus 100A is returned back to data before updating is performed. Further, the image forming apparatus 100A is reactivated. In case the system is partitioned as described above for the first embodiment, the switching process may only be performed to switch the partition to be activated.

The screen of FIG. 23 further includes information indicating a remaining time required for completing the updating process. With this information, the user can easily determine whether to continue or not continue updating processing.

In the second embodiment, updating firmware and setting data for the image forming apparatus is described. However, the above-described operation is applicable to the information processing apparatus 1500 illustrated in FIG. 15.

Figure 24:
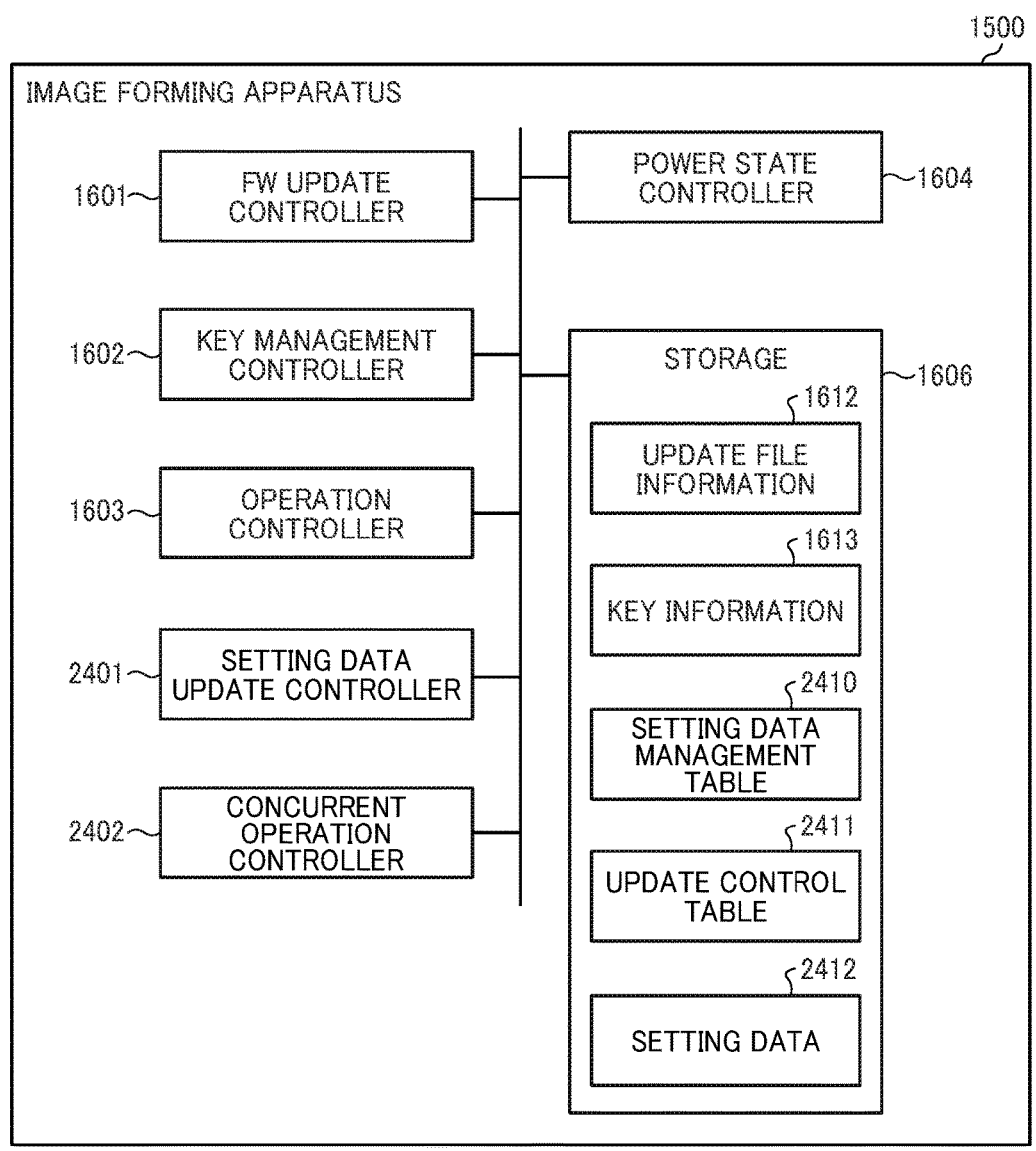
FIG. 24 is a schematic block diagram illustrating a functional configuration of the information processing apparatus according to the second embodiment.

FIG. 24 illustrates a functional configuration of the information processing apparatus 1500 according to the second embodiment. The information processing apparatus 1500 includes, in addition to functional units illustrated in FIG. 16, a setting data update controller 2401 and a concurrent operation controller 2402. The storage 1606 further includes a setting data management table 2410, an update control table 2411, and setting data 2412. These functional units, and data stored in the storage 1606, are substantially similar to the corresponding functional units and the data described above referring to FIG. 17.

In the second embodiment, updating of setting data and updating of firmware are concurrently performed, thus reducing a time required for updating.

Further, in the second embodiment, the storage may have a plurality of partitions including boot partitions and non-boot partitions as described above referring to the first embodiment. That is, the setting data may be stored in a plurality of partitions, with firmware used for updating. Alternatively, the setting data may be stored in a single partition and updated. In case the single partition is used, updating is performed while operation of shutting down of the image forming apparatus 100 is performed. In the second embodiment, updating of the firmware and updating of the setting data are performed concurrently.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. For example, operation of the first embodiment and operation of the second embodiment may be performed in combination.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus, comprising:
a memory including a plurality of storage areas including a first storage area and a second storage area, each of which stores a same program; and
circuitry configured to:
   obtain an update program to be used for updating the program stored in each one of the first storage area and the second storage area;
   update the program stored in the second storage area with the update program, when the first storage area is activated and the second storage area is not activated; and
   control the information processing apparatus to start operating with the updated program stored in the second storage area, after shutdown and activation of the information processing apparatus,
   wherein, after the information processing apparatus has started to operate with the updated program stored in the second storage area after the shutdown and activation, the circuitry is further configured to update the program stored in the first storage area with the update program stored in the second storage area so that the first and second storage areas store the same update program.

2. The information processing apparatus according to claim 1,
wherein the plurality of storage areas of the memory further includes a third storage area that stores setting data indicating a storage area to be activated at a next activation of the information processing apparatus after the update of the program has been completed,
wherein the circuitry is further configured to rewrite the setting data stored in the memory to indicate that the second storage area is to be activated at the next activation, and after shutdown and activation of the information processing apparatus, activate the updated program stored in the second storage area according to the rewritten setting data.

3. The information processing apparatus according to claim 2,
wherein, based on a determination that the update of the program has failed, the circuitry is further configured to not to rewrite the setting data stored in the memory.

4. The information processing apparatus according to claim 1, further comprising:
a display to display a result of the update of the program.

5. The information processing apparatus according to claim 4,
wherein, when the result indicates an update failure, the display displays a message indicating that the information processing apparatus can be continuously used.

6. The information processing apparatus according to claim 1,
wherein the memory further includes a third storage area that stores information not stored in any one of the first storage area and the second storage area, and
the circuitry is further configured to update the information stored in the third storage area during the shutdown of the information processing apparatus, based on a determination that the information stored in the third storage area is an update target.

7. The information processing apparatus according to claim 6,
wherein based on a determination that the update of the information stored in the third storage area has failed, the circuitry is further configured to update the information stored in the third storage area during the activation of the information processing apparatus.

8. The information processing apparatus according to claim 1,
wherein the program to be updated is a second program, the second program causing the circuitry to execute a first program that controls hardware of the information processing apparatus based on an instruction received from a user, and notifies the user of an execution result.

9. The information processing apparatus according to claim 1,
wherein the memory further includes a third storage area that stores setting data, and
the circuitry is further configured to concurrently perform updating of the program stored in at least one of the first storage area and the second storage area, and updating of the setting data.

10. The information processing apparatus according to claim 9,
wherein the circuitry is further configured to obtain first data associated with the setting data, the first data indicating whether or not to allow concurrent updating of the setting data and the program, and
the circuitry is further configured to concurrently perform updating of the program and updating of the setting data, based on the setting data indicating that concurrent updating is allowed.

11. The information processing apparatus of claim 10, wherein, when the setting data associated with the first data indicating not to allow concurrent updating is being updated, the circuitry is further configured to start updating the program after completion of updating of the setting data.

12. The information processing apparatus of claim 1, further comprising:
an image forming engine that performs at least one of a plurality of image forming jobs including printing, copying, scanning, and facsimile communication.

13. The information processing apparatus of claim 12,
wherein the circuitry is further configured to update the program stored in the second storage area in the background, during when the at least one of the plurality of image forming jobs is being performed.

14. A method of updating, performed by an information processing apparatus, the method comprising:
storing a same program in each of a first storage area and a second storage area of a memory of the information processing apparatus;
obtaining an update program to be used for updating the program stored in each one of the first storage area and the second storage area;
updating the program stored in the second storage area with the update program, when the first storage area is activated and the second storage area is not activated;
controlling the information processing apparatus to start operating with the updated program stored in the second storage area, after shutdown and activation of the information processing apparatus; and
updating the program stored in the first storage area with the update program stored in the second area, after the information processing apparatus has started to operate with the updated program stored in the second storage area after the shutdown and activation, so that the first and second storage areas store the same update program.

15. The method of claim 14, further comprising:
storing setting data in a third storage area of the memory of the information processing apparatus, the setting data indicating a storage area to be activated at a next activation of the information processing apparatus after the update of the program has been completed;
rewriting the setting data to indicate that the second storage area is to be activated at the next activation; and
activating the updated program stored in the second storage area according to the rewritten setting data after shutdown and activation of the information processing apparatus.

16. The method of claim 14, further comprising:
storing, in a third storage area of the memory of the information processing apparatus, information not stored in any one of the first storage area and the second storage area, and
updating the information stored in the third storage area during the shutdown of the information processing apparatus, based on a determination that the information stored in the third storage area is an update target.

17. A non-transitory recording medium which, when executed by one or more processors, cause the processors to perform a method of updating comprising:

storing a same program in each of a first storage area and a second storage area of a memory of the information processing apparatus;

obtaining an update program to be used for updating the program stored in each one of the first storage area and the second storage area;

updating the program stored in the second storage area with the update program, when the first storage area is activated and the second storage area is not activated;

controlling the information processing apparatus to start operating with the updated program stored in the second storage area, after shutdown and activation of the information processing apparatus; and updating the program stored in the first storage area with the update program stored in the second storage area, after the information processing apparatus has started to operate with the updated program stored in the second storage area after the shutdown and activation, so that the first and second storage areas store the same update program.

* * * * *